United States Patent [19]
Munemori et al.

[11] Patent Number: 6,029,023
[45] Date of Patent: Feb. 22, 2000

[54] IMAGE FORMING APPARATUS OPERATING IN COLOR MODE AND MONOCHROME MODE

[75] Inventors: Seiichi Munemori, Toyokawa; Hirokazu Matsuo, Toyohashi; Toru Kasamatsu; Takeshi Minami, both of Toyokawa; Satoru Kawata, Toyohashi; Takeshi Satake, Sakai, all of Japan

[73] Assignee: Minolta Co., Ltd., Osaka, Japan

[21] Appl. No.: 09/203,839

[22] Filed: Dec. 2, 1998

[30] Foreign Application Priority Data

Dec. 3, 1997 [JP] Japan ................................. 9-333202
Mar. 9, 1998 [JP] Japan ................................. 10-056558

[51] Int. Cl.[7] .......................... G03G 15/00; G03G 15/01; G03G 15/16
[52] U.S. Cl. ................................ 399/66; 399/82; 399/299
[58] Field of Search ............................ 399/54, 82, 85, 399/184, 223, 228, 299, 66, 317; 347/115; 358/501

[56] References Cited

U.S. PATENT DOCUMENTS 5,313,312  5/1994  Yamada ................................. 358/505
5,893,017  4/1999  Yamamoto ............................ 399/299

FOREIGN PATENT DOCUMENTS 3-288173  12/1991  Japan .
6-102776   4/1994  Japan .
6-258914   9/1994  Japan .
9-292753  11/1997  Japan .

*Primary Examiner*—Joan Pendegrass
*Attorney, Agent, or Firm*—Morrison & Foerster LLP

[57] ABSTRACT

An image forming apparatus operates in a color mode using a plurality of image holding components and in a monochrome mode using one of the plurality of image holding components to perform the image formation. The mode is switched between the color mode and the monochrome mode in accordance with information, such as the number of monochrome images having been successively formed, the number of monochrome images to be successively formed, a time period having been taken for the monochrome image formation, productivity or life priority specified the user, and a standby state of the image forming apparatus in the color mode or the monochrome mode, with a distance between the recording sheets to be transported being controlled according to predetermined conditions.

28 Claims, 25 Drawing Sheets

Fig. 17

| No.(R) | FLAG |
|---|---|
| 1 | 0 |
| 2 | 1 |
| 3 | 1 |
| ⋮ | ⋮ |
| n−4 | 1 |
| n−3 | 1 |
| n−2 | 1 |
| n−1 | 0 |
| n | 0 |

36a → No.(R)
36b → FLAG

Fig. 18

| 37a | 37b |
|---|---|
| No.(R) | FLAG |
| 1 | 0 |
| 2 | 0 |
| 3 | 1 |
| 4 | 1 |
| 5 | 0 |
| 6 | 0 |

Rows: 371a/371b, 372a/372b, 373a/373b, 374a/374b, 375a/375b, 376a/376b

IMAGE FORMING APPARATUS OPERATING IN COLOR MODE AND MONOCHROME MODE

This application is based on applications No. 9-333202 and No. 10-56558 filed in Japan, the contents of which are hereby incorporated by reference.

BACKGROUND OF THE INVENTION (1). Field of the Invention

The present invention relates to an image forming apparatus, such as a copying machine, printer, and facsimile, which can form a full-color image, and particularly relates to a full-color image forming apparatus which forms an image on a transfer material such as a recording sheet using image holding components.

(2). Description of the Related Art

Tandem type full-color image forming apparatuses, as examples of a conventional full-color image forming apparatus which can form a full-color image, have come to dominate in this field in recent years. The tandem type full-color image forming apparatus has four photosensitive drums. Axes of the photosensitive drums are parallel to one another and orthogonal to the direction of the length of a transport belt. Toner images corresponding to reproduction colors cyan, magenta, yellow, and black (respectively referred to as C, M, Y and K hereinafter) are separately formed on the photosensitive drums, and are sequentially transferred onto a transfer material which is transported on the transport belt. The toner images are superimposed on the transfer material to form a full-color image.

When forming a black image using this tandem type full-color image forming apparatus (hereinafter, the black image is referred to as the "monochrome image" and a mode for forming a monochrome image is referred to as the "monochrome mode"), the user sets only monochrome documents to the apparatus and specifies the monochrome mode using an operation panel or the like, so that image formation is performed using only a photosensitive drum used for the black image formation. In this case, the four photosensitive drums are all driven. However, the photosensitive drums for C, M, and Y are not used for the black image formation although being rotated. By doing so, the construction used for the monochrome image formation can be minimized, thereby simplifying the construction of an image forming mechanism. Some types of conventional tandem type full-color image forming apparatuses employ this technique (referred to as the "first technique" hereinafter).

In contrast to the first technique, there has been another technique (referred to as the "second technique" hereinafter) where the rotations of the photosensitive drums corresponding to the reproduction colors which are not used for the monochrome image formation are stopped and these photosensitive drums are separated from a surface of the transport belt in the monochrome mode. This second technique is disclosed in Japanese Laid-Open Patent Applications No. 3-288173, No. 6-258194, and No. 6-102776.

Using the first technique, all the photosensitive drums are driven even in the monochrome mode, so that cleaning components come in contact with the corresponding surfaces of the photosensitive drums. Here, toner is not attracted to the photosensitive drums for C, M, and Y, and accordingly, excess frictional resistance is produced on the surfaces of the photosensitive drums that are not used for the monochrome image formation. This shortens the lifespans of the photosensitive drums, and leads to wear and tear on the cleaning components.

Using the second technique, a switching operation is performed to switch states between where the transport belt is separated from the photosensitive drums (referred to as the "separated state" hereinafter) and where the transport belt is pressed against the photosensitive drums (referred to as the "pressing state" hereinafter). When the switching operation is performed, operations including the image forming operation, such as the exposure on the photosensitive drums and the toner image transfer onto the transfer material, and the paper feeding operation need to be temporarily stopped. Due to this suspension, the image forming efficiency is not expected to be high.

In recent years, while images to be formed have been increasingly multicolored, there are still monochrome documents, such as documents including only characters. A copying operation may be requested for a mixture of color and monochrome documents.

To automatically perform the copying operation for the mixture of color and monochrome documents, each document needs to be judged whether it is color or monochrome before the image formation is performed. However, it is impossible to perform this automatic copying operation using the first and second techniques since the stated conventional image forming apparatus has no judging functions to judge whether a document is color or monochrome.

Suppose that the judging function for judging whether a document is color or monochrome is added to the conventional image forming apparatuses so that the mode can be switched between the color mode and the monochrome mode in accordance with the judgement result. Here, the conventional image forming apparatus using the first technique still has the stated problems, such as the shorter lifespans of the photosensitive drums and the wear and tear on the cleaning components, since the monochrome image formation is performed with all of the photosensitive drums being driven and with the three photosensitive drums being rotated without taking part in the monochrome image formation.

Also, the conventional image forming apparatus using the second technique, where the rotations of the photosensitive drums not used for the monochrome image formation are stopped and the transport belt is separated from those photosensitive drums in the monochrome mode, still has the stated problem that the image forming efficiency is not so high. In addition to this problem, the transport belt is repeatedly separated from or pressed against the photosensitive drums in accordance with the judgement results during a series of copying operations. As a result, image deterioration may occur on a reproduced image due to the mechanical vibrations caused by the switching operation.

SUMMARY OF THE INVENTION

The object of the present invention is to provide novel and effective means, by which image forming operations for the mixture of color and monochrome documents are automatically performed, with the problems of the stated first and second techniques being solved.

The object of the present invention can be realized by a first image forming apparatus made up of: an obtaining unit for obtaining image data of an image which is to be formed; a judging unit for judging whether the image which is to be formed is a color image or a monochrome image; a plurality of developing units; a first image forming unit for forming an image using at least one of the plurality of developing units, with the developing units aside from the at least one of the plurality of developing units being operational, in accordance with the image data obtained by the obtaining unit; a second image forming unit for forming an image using one of the plurality of developing units in accordance with the image data obtained by the obtaining unit; and a controlling unit for having the second image forming unit form an image in a case where the image to be formed is a monochrome image and monochrome image formations have been successively performed at least a predetermined number of times, and for having the first image forming unit form an image in all other cases.

With this construction, the image forming operations are reliably performed for the mixture of color and monochrome documents. The mode does not need to be repeatedly switched between the color mode and the monochrome mode in accordance with a judgement result as to whether the document is color or monochrome. The mode is switched from the color mode to the monochrome mode only when the predetermined condition is satisfied. Consequently, the image forming processing can be efficiently performed. Also, the activation of components, such as the image holding components, which are not used for the monochrome image formation is suppressed to a certain extent, thereby increasing the lifespans of the components.

It should be noted here that the judging unit may judge whether the document is color or monochrome using the image data used for the image formation, or using different data to the data directly used for the image formation.

It is desirable that the image forming apparatus is further made up of a transporting time interval controlling unit for controlling a time interval between image carriers that are transported before and after separation by the separating unit.

With this construction, deterioration in the image quality due to the mechanical vibrations caused by the mode switching operation can be prevented.

The object of the present invention can be also realized by a second image forming apparatus made up of: an obtaining unit for obtaining image data of an image which is to be formed; a plurality of developing units; a first image forming unit for forming an image using at least one of the plurality of developing units, with the developing units aside from the at least one of the plurality of developing units being operational, in accordance with the image data obtained by the obtaining unit; a second image forming unit for forming an image using one of the plurality of developing units in accordance with the image data obtained by the obtaining unit; a mode selecting unit for selecting an image formation mode from a first mode and a second mode; a judging unit for judging whether the image which is to be formed is a color image or a monochrome image; a controlling device, which includes a switching unit for switching between having an image formed by the first image forming unit and having an image formed by the second image forming unit in accordance with a judgement result given by the judging unit, for controlling the switching unit to switch less frequently when the first mode is selected than when the second mode is selected.

With this construction, in addition to the useful effect of the first image forming apparatus, the user can assign top priority to productivity of the image formation or to lives of the expendable components such as the image holding components.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 17 shows contents of a table provided in a copying order storage unit;

FIG. 18 shows contents of a table provided in a copying order storage unit;

DESCRIPTION OF PREFERRED EMBODIMENTS

The following is a description of embodiments of the image forming apparatus of the present invention, with reference to the drawings. In these embodiments, a tandem type full-color image forming apparatus (simply referred to as the "copier" hereinafter) is used as an example of such an image forming apparatus.

First Embodiment

Figure 1:
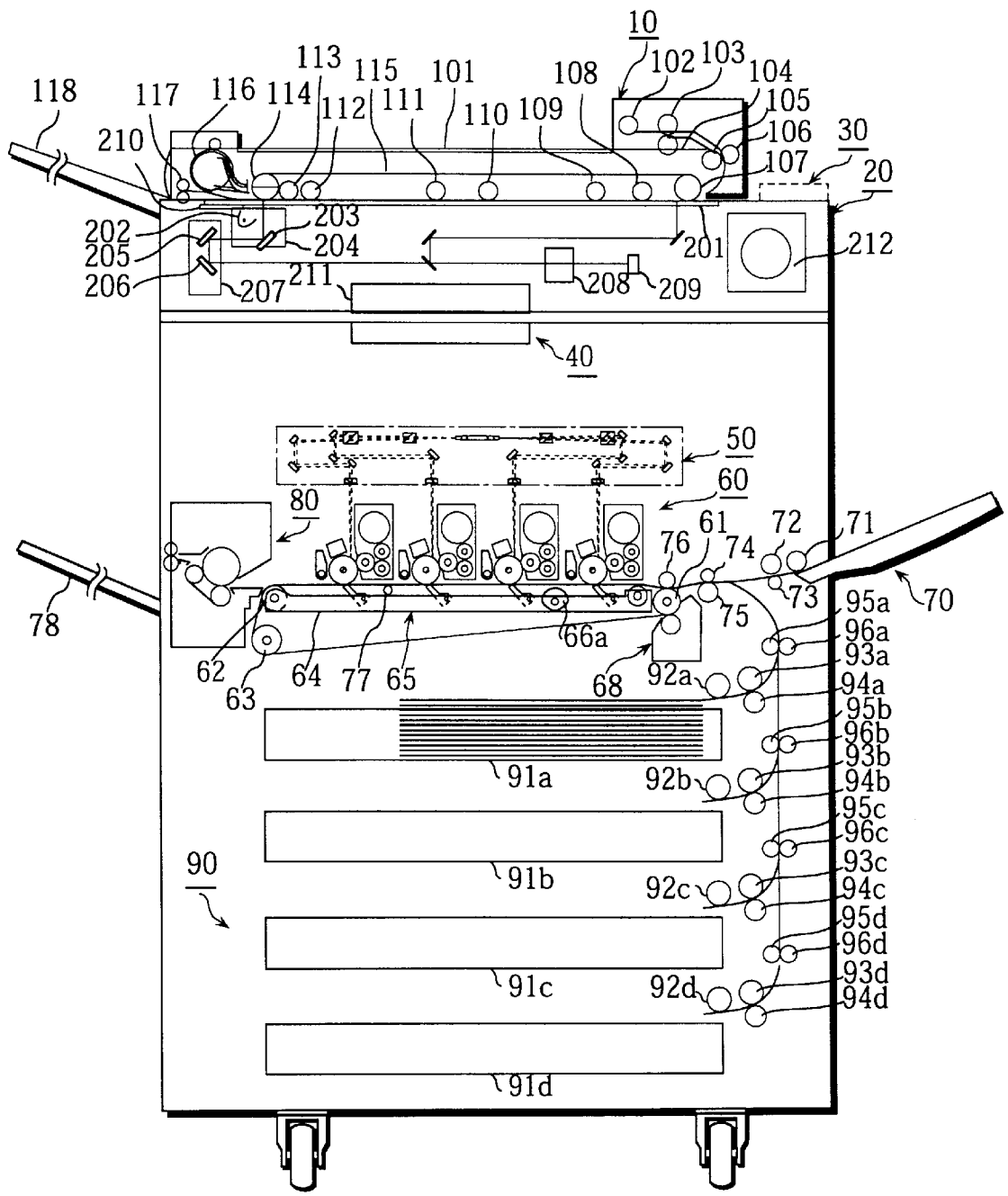
FIG. 1 is a front view showing main components of a tandem type full-color image forming apparatus of an embodiment of the present invention.

FIG. 1 is an internal front view showing the main components of the copier of the present embodiment. As shown in FIG. 1, the copier is composed of an automatic document feeder 10, an image reading unit 20, a controlling unit 40, a scanning optical system 50, a printing unit 60, and a paper feeding unit 90.

The automatic document feeder 10 is a well-known device which is provided with a document setting tray 101, feeding rollers 102 to 106, a document transporting belt 115 which runs over rollers 107 to 114 and is set parallel to a surface of a platen glass 201 (described later), a document switchback unit 116, a discharging roller 117, and a document discharging tray 118 in this order in a transportation direction of a document. Note that a plurality of documents can be set on the document setting tray 101, and the document transporting belt 115 can transport the documents one at a time by being rotationally driven by a driving motor (not shown).

The image reading unit 20 includes the platen glass 201. Under the platen glass 201, a first sliding unit 204 having an exposure lamp 202 and a mirror 203, a second sliding unit 207 having mirrors 205 and 206, a zoom lens 208, and a CCD scanner 209 are set at the positions as shown in FIG. 1. The first and second sliding units 204 and 207 can laterally move along a plane parallel to the surface of the platen glass 201. A driving motor 212 set at the right side in the image reading unit 20 is used for driving the first and second sliding units 204 and 207. A white standard plate 210 is used for shading correction and set under the platen glass 201 at the position shown in FIG. 1. A digital signal-processing unit 211 has a RAM for storing image data of the document for each of colors red (R), green (G), and blue (B) and also has a controlling circuit for performing correction processes on the image data. The digital signal-processing unit 211 will be described in detail later in this specification.

The controlling unit 40 is connected to a driving system, such as a driving motor, of each component provided in the copier. The controlling unit 40 includes a CPU (not shown) and a ROM (not shown) to control and manage a series of processes related to the image forming operation of the copier used in the present embodiment. The series of processes will be described in detail later in this specification. The controlling unit 40 is closely connected to the digital signal-processing unit 211.

Figure 2:
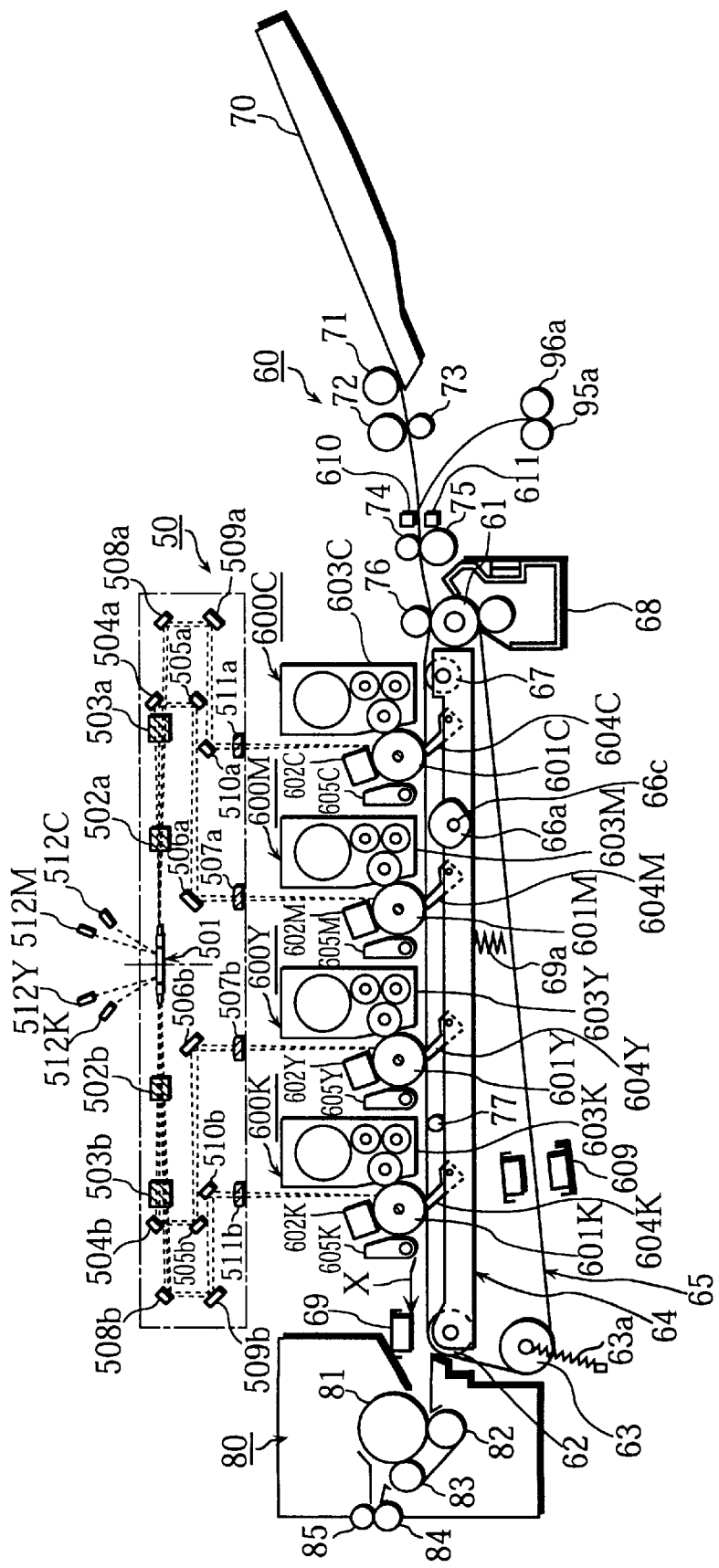
FIG. 2 shows a detailed construction, with a printing unit 60 being a central component.

FIG. 2 is a front view showing the components around a printing unit 60 and also shows the detailed construction of the scanning optical system 50 and the printing unit 60. The scanning optical system 50 is composed of a polygon mirror 501 as a central component, mirrors 502a to 511a and 502b to 511b, and laser diodes 512C to 512K.

The polygon mirror 501 and the mirrors 502a to 511a and 502b to 511b are set at respective predetermined angles so that light beams corresponding to the reproduction colors C, M, Y, and K are directed to scan the corresponding surfaces of photosensitive drums 601C to 601K. Each light path of the laser beams is shown in a dash line in FIG. 2.

The printing unit 60 is set in the middle of an enclosure of the copier (under the scanning optical system 50 in FIG. 2), and is mainly composed of a transporting belt 65 and image forming stations or units 600C to 600K. The transporting belt 65 runs over a driving roller 61, slave rollers 62 and 67, and a tension roller 63, and is rotationally driven in an X direction indicated by the arrow in FIG. 2, with the side where the driving roller 61 is located being the upstream side on a transportation path of a recording sheet. Hereinafter, the sides viewed in the transportation direction of the recording sheet are simply referred to as the "upstream side" and the "downstream side" in this specification. The image forming stations 600C to 600K are uniformly spaced and parallel to one another, being set to intersect the X direction at right angles.

The image forming stations 600C to 600K respectively include the photosensitive drums 601C to 601K which are set parallel to the direction of the length of the image forming stations 600C to 600K. Chargers 602C to 602K, developing units 603C to 603K, transfer brushes 604C to 604K, and drum cleaners 605C to 605K are respectively provided around the photosensitive drums 601C to 601K. The image formation is performed by the image forming stations 600C to 600K using the well-known Carlson process. A belt cleaner 68 and a separating charger 69 are respectively set at the upstream side and downstream side of the transporting belt 65. A charge eliminator 609 is provided on a return path of the transporting belt 65 at the position as shown in FIG. 2.

Figure 3:
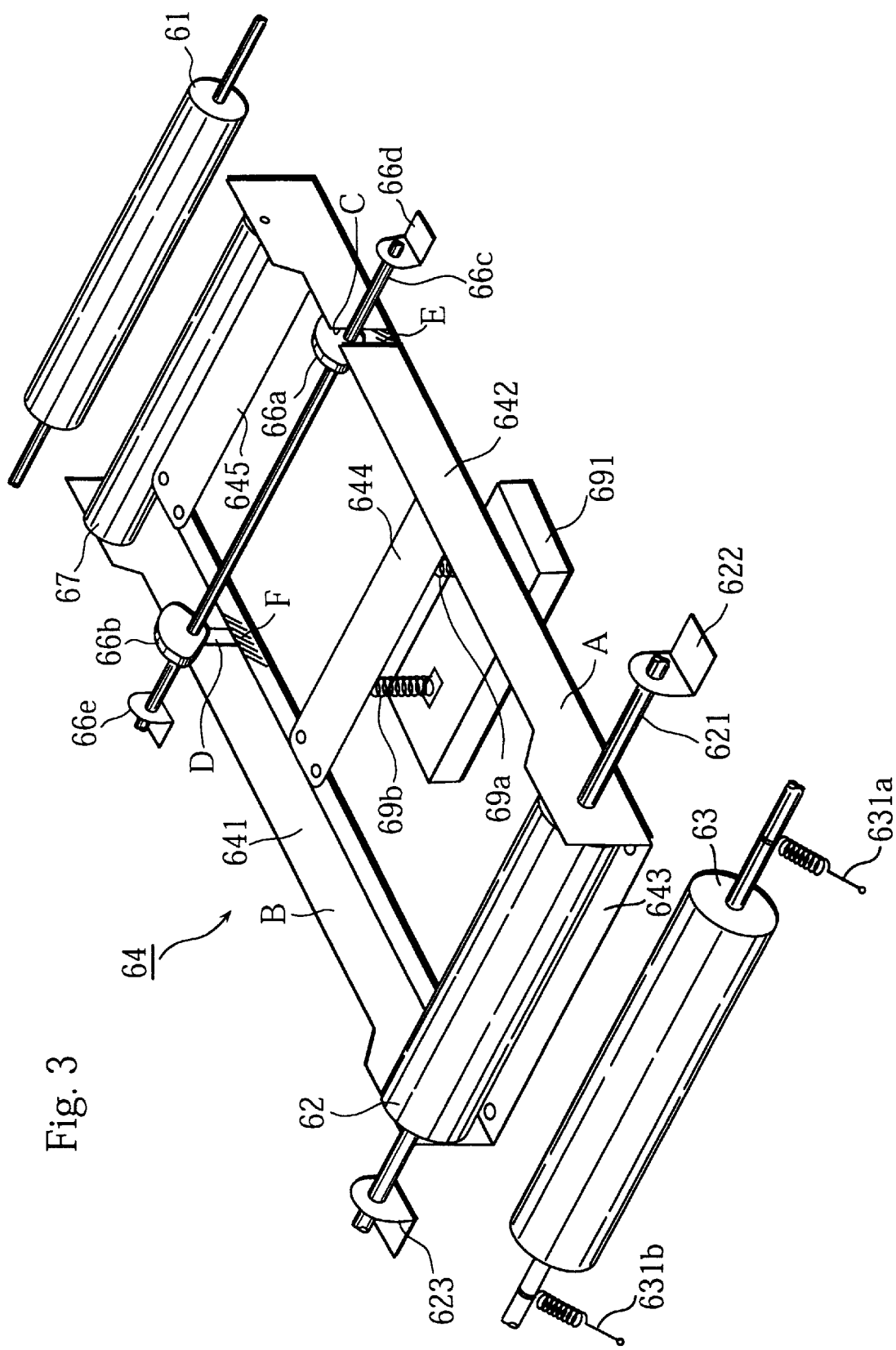
FIG. 3 is a perspective view of a frame 64.

A frame 64 is set at the underside of the transporting belt 65, with its direction of the length being parallel to the transport belt 65. As shown in the perspective view of FIG. 3, the frame 64 is formed of two L-shaped steel plates 641 and 642 and three rectangular plates 643 to 645. The L-shaped steel plates 641 and 642 face each other with a predetermined distance left between them and are connected to each other by the rectangular plates 643 to 645. Shafts of the slave rollers 62 and 67 are set between sides A and B at both ends of the frame 64 as shown in FIG. 3 so that the slave rollers 62 and 67 may freely rotate. The transfer brushes 604C to 604K are uniformly spaced between the slave rollers 62 and 67, although not shown in FIG. 3.

A shaft 621 of the slave roller 62 is longer than a width of the frame 64 and supported by flanges 622 and 623 which are set independently of the frame 64 and fixed to the enclosure of the copier.

Springs 69a and 69b are set between the backside of the frame 64 (or, the backside of the rectangular plate 644 in FIG. 3) and a stage 691 fixed to the enclosure of the copier. The frame 64 is pushed upward by the springs 69a and 69b, with the shaft 621 being fixed.

Notches C and D are set on the sides A and B of the L-shaped steel plates 641 and 642 at optimum positions close to the slave roller 67. A cam shaft 66c, which is supported by bearings 66d and 66e located outside the frame 64, passes through the notches C and D. Cams 66a and 66b are fixed to the cam shaft 66c and respectively set close to the sides A and B inside the frame 64. The front side end of the cam shaft 66c (as the frame 64 is viewed in FIG. 3) is connected to a driving system of a stepping motor (not shown). With this construction, when a certain rotational driving force is given to the cam shaft 66c by the driving system, the cams 66a and 66b respectively come in contact with bottom sides E and F of the L-shaped steel plates 641 and 642. Here, the cams 66a and 66b push the frame 64 downward against the tension of the springs 69a and 69b, with the shaft 621 of the slave roller 62 being fixed.

Figure 4:
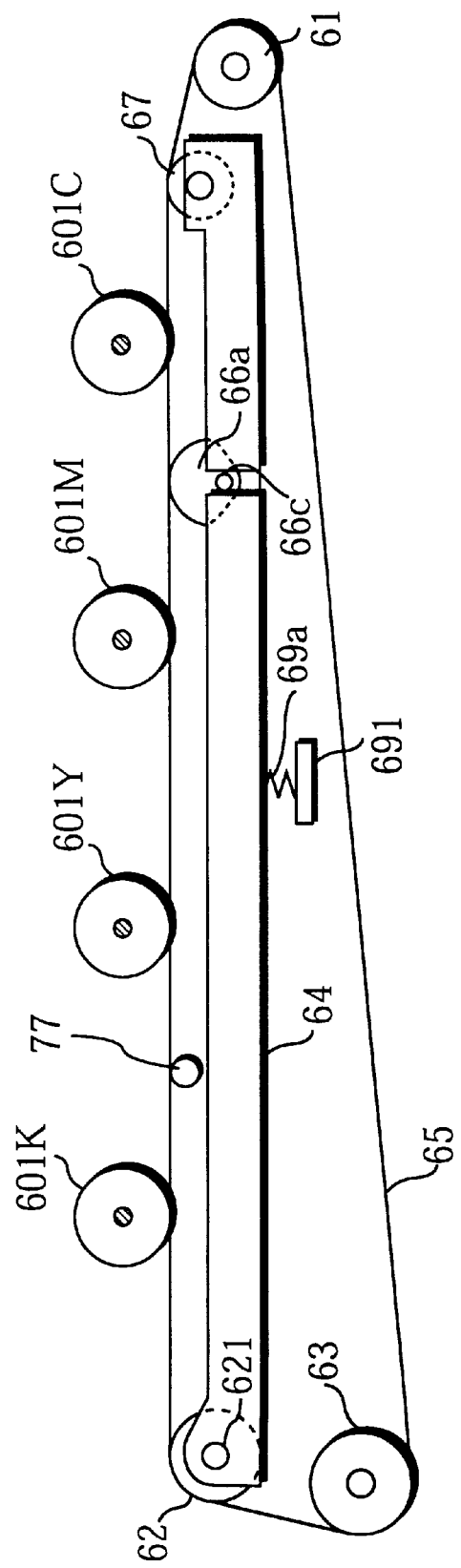
FIG. 4 shows a state of the frame 64 in the color mode.
Figure 5:
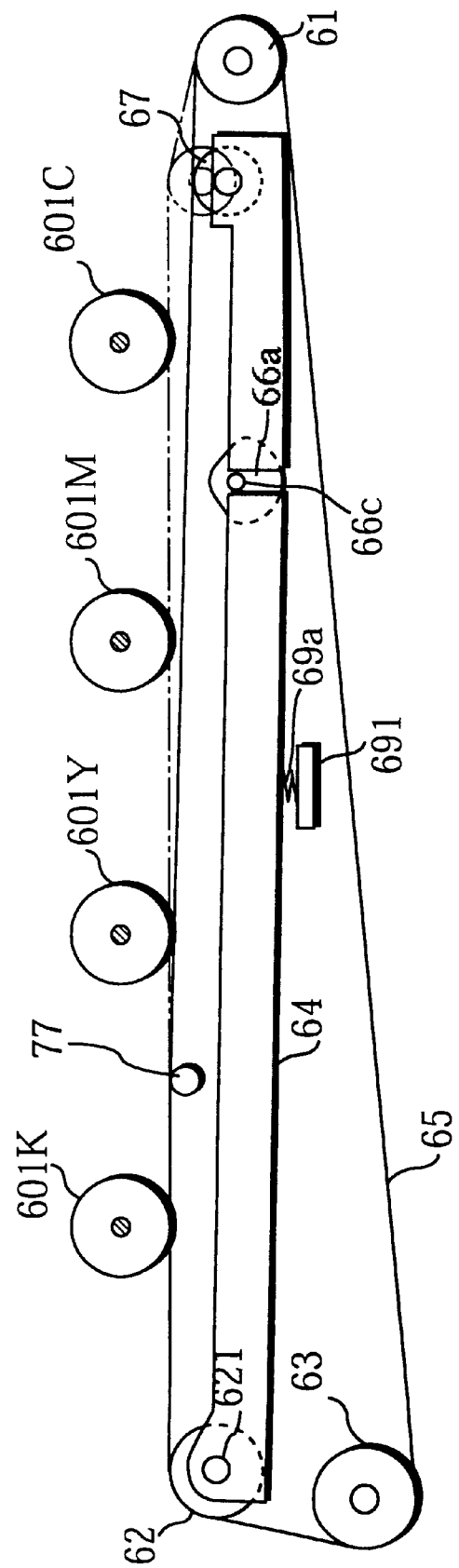
FIG. 5 shows a state of the frame 64 in the monochrome mode.

By means of the above movement of the frame 64, when the cams 66a and 66b are not activated, the surface of the transporting belt 65 is in contact with the circumferential surfaces of the photosensitive drums 601C to 601K as shown in FIG. 4. When the cams 66*a* and 66*b* are activated, a section of the transporting belt 65 between the slave roller 62 and a slave roller 77 which is fixed to the enclosure of the copier via bearings is kept in contact with the photosensitive drum 601K, while the surface of the transporting belt 65 aside from the stated section is separated from the photosensitive drums 601C to 601Y as shown in FIG. 5 since the frame 64 is shifted downward. Hereinafter, a state where the transporting belt 65 is in contact with all of the photosensitive drums 601C to 601K is referred to as the "color mode" and a state where the transporting belt 65 is in contact with only one photosensitive drum (in this case, 601K) is referred to as the "monochrome mode". It should be noted here that the mode in the initial state of the copier is set in the color mode and switched from the color mode to the monochrome mode when necessary in the present embodiment. However, when the copying operation is finished in the monochrome mode, the copier waits for a next copying operation in the monochrome mode. Hereinafter, a state where the copier waits for a next copying operation is referred to as the "standby state".

As shown in FIG. 1, the paper feeding unit 90 is set lower space of the enclosure of the copier. The paper feeding unit 90 is composed of paper feeding cassettes 91*a* to 91*d*, feeding rollers 92*a* to 92*d* respectively set above the upper right corners of the paper feeding cassettes 91*a* to 91*d*, and transporting rollers 93*a* to 96*a*, 93*b* to 96*b*, 93*c* to 96*c*, and 93*d* to 96*d*.

A manual feeding tray 70, feeding rollers 71 to 73, and synchronizing rollers 74 and 75 are set on the right side of the transporting belt 65 at positions as shown in FIG. 1. A fixing unit 80 and a discharging tray 78 are set on the left side of the transporting belt 65 at positions as shown in FIG. 1. Photo couplers 610 and 611 are set at the upstream side of the synchronizing rollers 74 and 75 as shown in FIG. 2.

Figure 6:
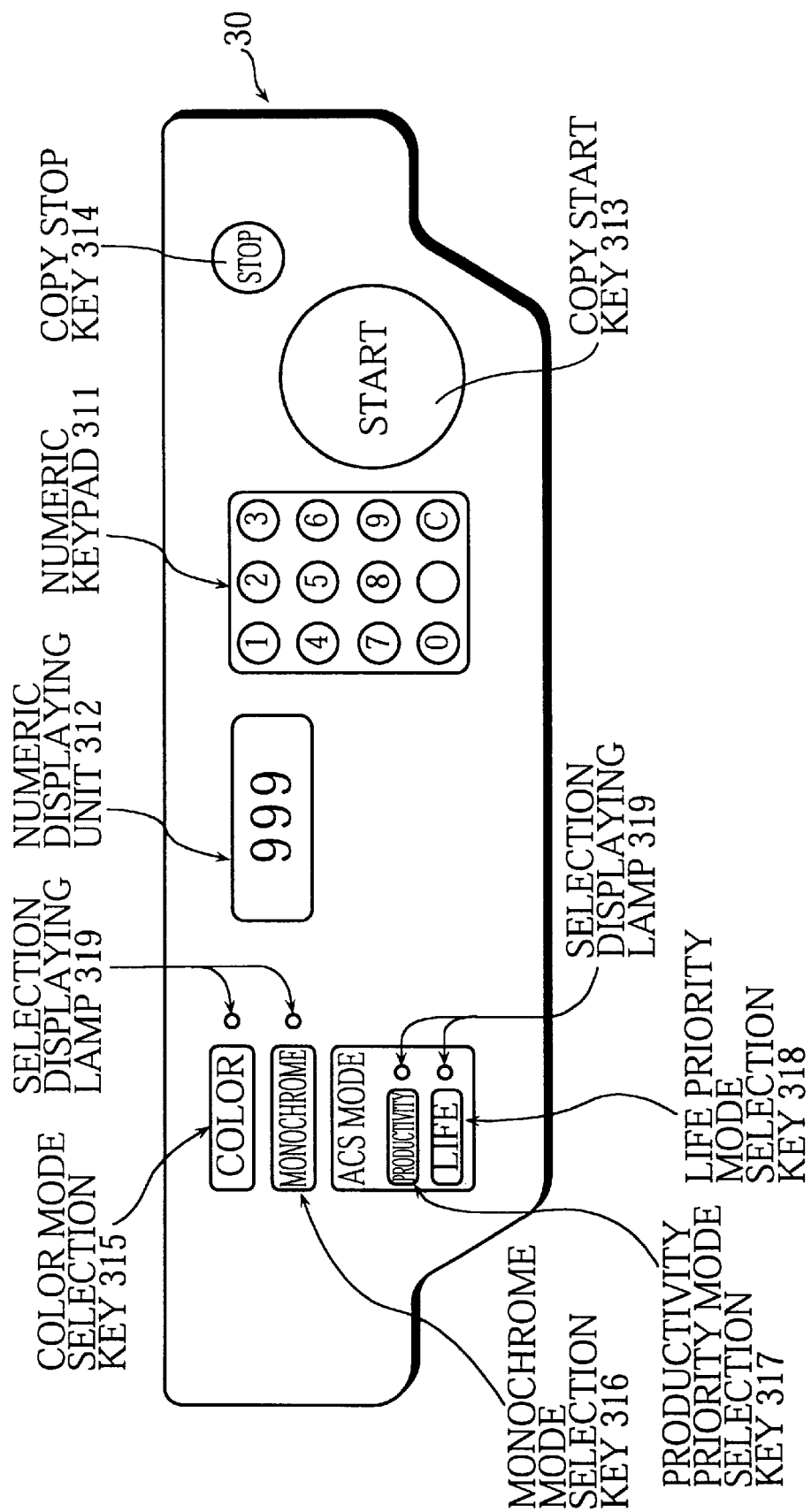
FIG. 6 is an example of an operation panel.

An operation panel 30 is provided on an optimum position on the top of the enclosure including the image reading unit 20, as indicated by a dash line in FIG. 1. FIG. 6 shows an example of the operation panel 30.

The operation panel 30 receives operations and various settings from the user, and displays a set content and so forth.

The operation panel 30 includes a numeric keypad 311 for setting the number of copies, a numeric displaying unit 312 for displaying the number of copies, a copy start key 313 for indicating a start of copying, a copy stop key 314 for indicating a stop of copying, a color mode selection key 315 for selecting the color mode, a monochrome mode selection key 316 for selecting the monochrome mode, a productivity priority mode selection key 317 for selecting a productivity priority mode, a life priority selection key 318 for selecting a life priority mode, and a selection displaying lamp 319 for indicating each selected mode.

Note that the life priority mode is automatically selected when the power is turned on, when the copying operation is reset, or after a predetermined period of time has elapsed since the last copying operation.

The digital signal-processing unit 211 is set between the image reading unit 20 and the scanning optical system 50 and composed of a board on which a CPU, a ROM, and an IC are set as central components. In general, the digital signal-processing unit 211 temporarily stores the image data of the document read by the image reading unit 20 for each of the colors R, G, and B, sequentially converts the R, G, and B image data into C, M, Y, and K image data, and then outputs the converted image data to the scanning optical system 50 via the controlling unit 40. In addition to this operation, the digital signal-processing unit 211 of the present embodiment controls the shift movement of the frame 64 of the printing unit 60. The following is a detailed description of an automatic color selection function (referred to as the "ACS" function hereinafter) of the digital signal-processing unit 211, with reference to the block diagram shown in FIG. 7.

Figure 7:
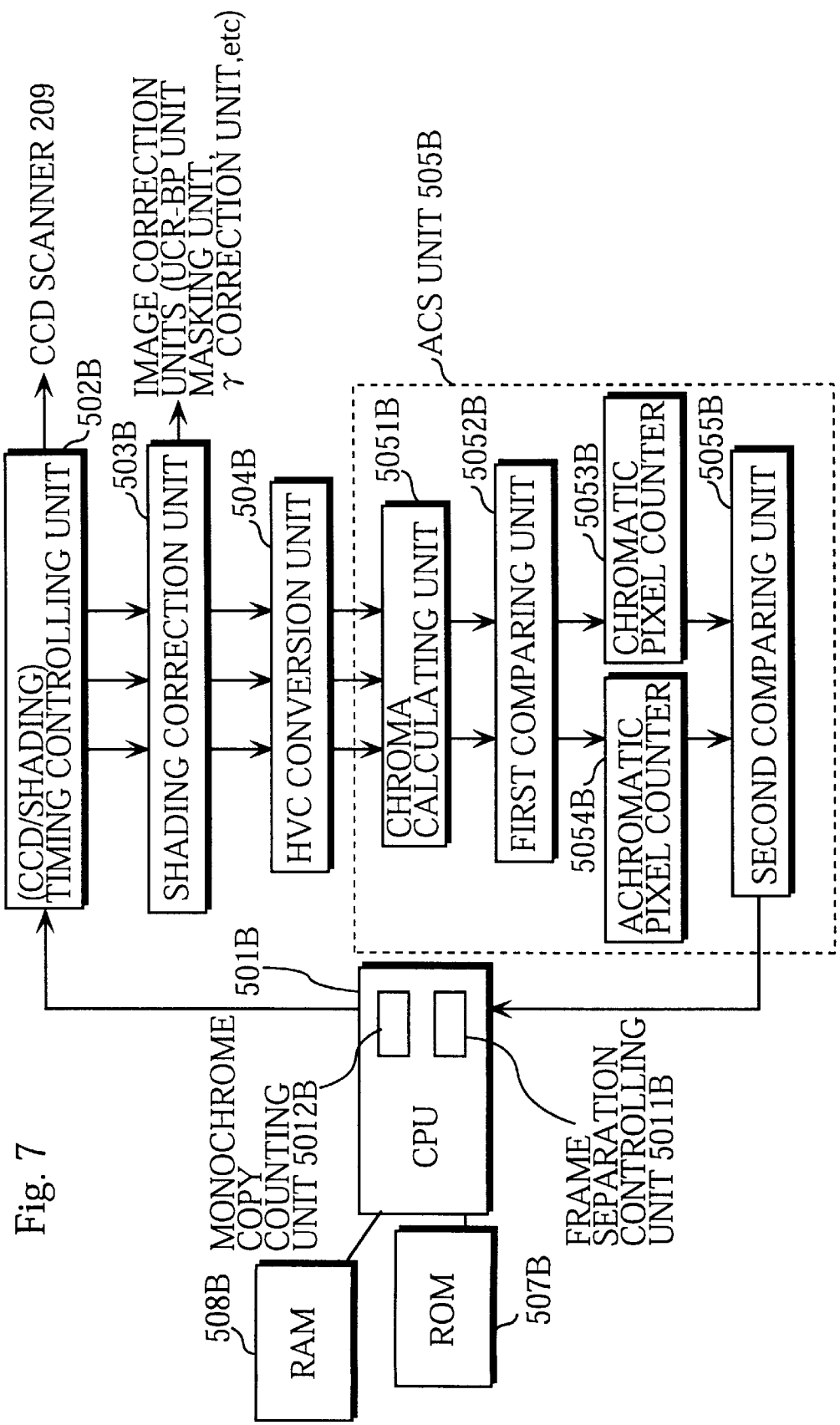
FIG. 7 is a block diagram showing a digital signal-processing unit 211.

As shown in FIG. 7, the digital signal-processing unit 211 is composed of a CPU 501B, a ROM 507B, a RAM 508B, a timing controlling unit 502B, a shading correction unit 503B, an HVC conversion unit 504B, an ACS unit 505B, and well-known image correction units, such as a UCR-BP unit, a masking unit, and a γ correction unit.

The timing controlling unit 502B controls an operation timing for the scanning by the CCD scanner 209 and the shading correction, and is connected to the CPU 501B.

The shading correction unit 503B eliminates varying light distribution of the exposure lamp 202 and variations in sensitivity of the CCD scanner 209. More specifically, the CCD scanner 209 reads the white standard plate 210 provided at one end (the left end in FIG. 1) of the platen glass 201 when performing the pre-scanning. In accordance with the data read by the CCD scanner 209, the shading correction unit 503B determines a multiplication ratio to be used for the shading correction for each of R, G, or B color pixels of the document image data and stores the multiplication ratio in a RAM 508B. When the document image is read, the shading correction unit 503B fetches the multiplication ratio from the RAM 508B to correct the document image data. Here, the shading correction unit 503B outputs data in two directions. More specifically, the shading correction unit 503B outputs data in one direction, in which the data to be used for the image formation is outputted to the well-known image correction units, such as the UCR-BP unit, the masking unit, and the γ correction unit. Meanwhile, the shading correction unit 503B outputs the data in the other direction in which the data is outputted to the ACS unit 505B through the HVC conversion unit 504B.

In general, the HVC conversion unit 504B converts the image data corrected for each of the colors R, G, and B by the shading correction unit 503B into data for Hue angle (H*), Value (V), and Chroma (C*) of a color area signal in a uniform color space of the well-known Munsell color system (not shown). The HVC conversion unit 504B of the present embodiment sends the ACS unit 505B the data of Value (V) and color differences ($W_R$ and $W_B$) obtained in a process where data for each of H, V, and C is calculated.

The ACS unit 505B includes a chroma calculating unit 5051B, a first comparing unit 5052B, a chromatic pixel counter 5053B, an achromatic pixel counter 5054B, and a second comparing unit 5055B. The ACS unit 505B judges whether a document is chromatic or achromatic from the R, G, and B data of the document.

Of these units included in the ACS unit 505B, the chroma calculating unit 5051B calculates a chroma signal W of data from each of V, $W_R$, and $W_B$ calculated by the HVC conversion unit 504B for each pixel of the document, according to the following equation.

$$W = (W_R^2 + W_B^2)^{1/2} \qquad \text{(Equation 1)}$$

The first comparing unit 5052B judges whether the calculated W exceeds a predetermined threshold. More specifically, the first comparing unit 5052B judges that a pixel is chromatic if the calculated W exceeds the predetermined threshold, while judging that a pixel is achromatic if the calculated W does not exceed the predetermined threshold. The respective judgement results are separately counted by the chromatic pixel counter 5053B and the achromatic pixel counter 5054B connected to the first comparing unit 5052B.

The second comparing unit 5055B divides the number of chromatic pixels counted by the chromatic pixel counter 5053B by the sum of the pixels counted by the chromatic pixel counter 5053B and the achromatic pixel counter 5054B to obtain the ratio of the number of the chromatic pixels to the number of pixels in the page. In the same way, the second comparing unit 5055B divides the number of achromatic pixels counted by the achromatic pixel counter 5054B by the sum of the pixels to obtain the ratio of the number of the achromatic pixels to the number of the pixels in the page. The second comparing unit 5055B judges from the respective ratios whether the document to be copied is color or monochrome. If the calculated chromatic pixel ratio is equal to or above 0.1% of the total number of pixels in the page, the second comparing unit 5055B judges that the document is color.

The ROM 507B stores control programs, such as a frame separation control program and a sheet distance control program, used by the CPU 501B and also stores a predetermined value to compare it to a count value of monochrome copies.

The RAM 508B is used as a storage area for storing the multiplication ratio for each pixel of R, G, and B image data of the document for the shading correction as stated above, and is also used as an area for storing the image data of the document for each of the colors R, G, and B.

The CPU 501B serves as an auxiliary to a CPU of the controlling unit 40. The CPU 501B includes a frame separation controlling unit 5011B and a monochrome copy counting unit 5012B, and controls operations performed by the components of the printing unit 60.

When the ACS unit 505B judges that the document to be copied is monochrome, the monochrome copy counting unit 5012B counts the number of copies to be made. The value obtained by counting the number of monochrome copies is compared to the predetermined value stored in the ROM 507B every time the number of copies is incremented by "1". The CPU 501B determines an instruction to control the frame separation controlling unit 5011B in accordance with the comparison result. In the present embodiment, the predetermined value is set at "3".

During this counting operation for the monochrome copies, a document to be copied may change from monochrome to color. In this case, the counting operation is stopped. Note that the monochrome copy counting unit 5012B is not activated when all of documents to be copied are color.

When the count value of the monochrome copy counting unit 5012B exceeds the predetermined value "3", the frame separation controlling unit 5011B controls the separation of the frame 64 via the controlling unit 40 according to the frame separation control program. Before the control of the frame separation, a separation control flag is set in the CPU 501B (i.e., the flag is set at "1"). While this flag is set, the frame 64 is kept in the separated state. The flag is reset (i.e., the flag is set at "0") when the mode is changed from the monochrome mode which has been continuously operational to the color mode or when all of documents to be copied are color.

As an important function to keep an excellent copying speed, the CPU 501B controls a distance between the recording sheets which are sequentially transported, according to the sheet distance control program.

The following is a specific description of the sheet distance control program, with reference to FIGS. 8 to 13. These drawings are the views showing around the image forming stations and showing distances between the recording sheets being transported. In these drawings, a distance between the recording sheets is referred to as "X", a length along each circumference of the photosensitive drums 601C to 601K from an exposure position and a transfer position is referred to as "$L_1$", the system speed is referred to as "V", and a time required for the frame separating operation is referred to as "T". The recording sheets being transported are referred to as ① to ⑧.

Figure 8:
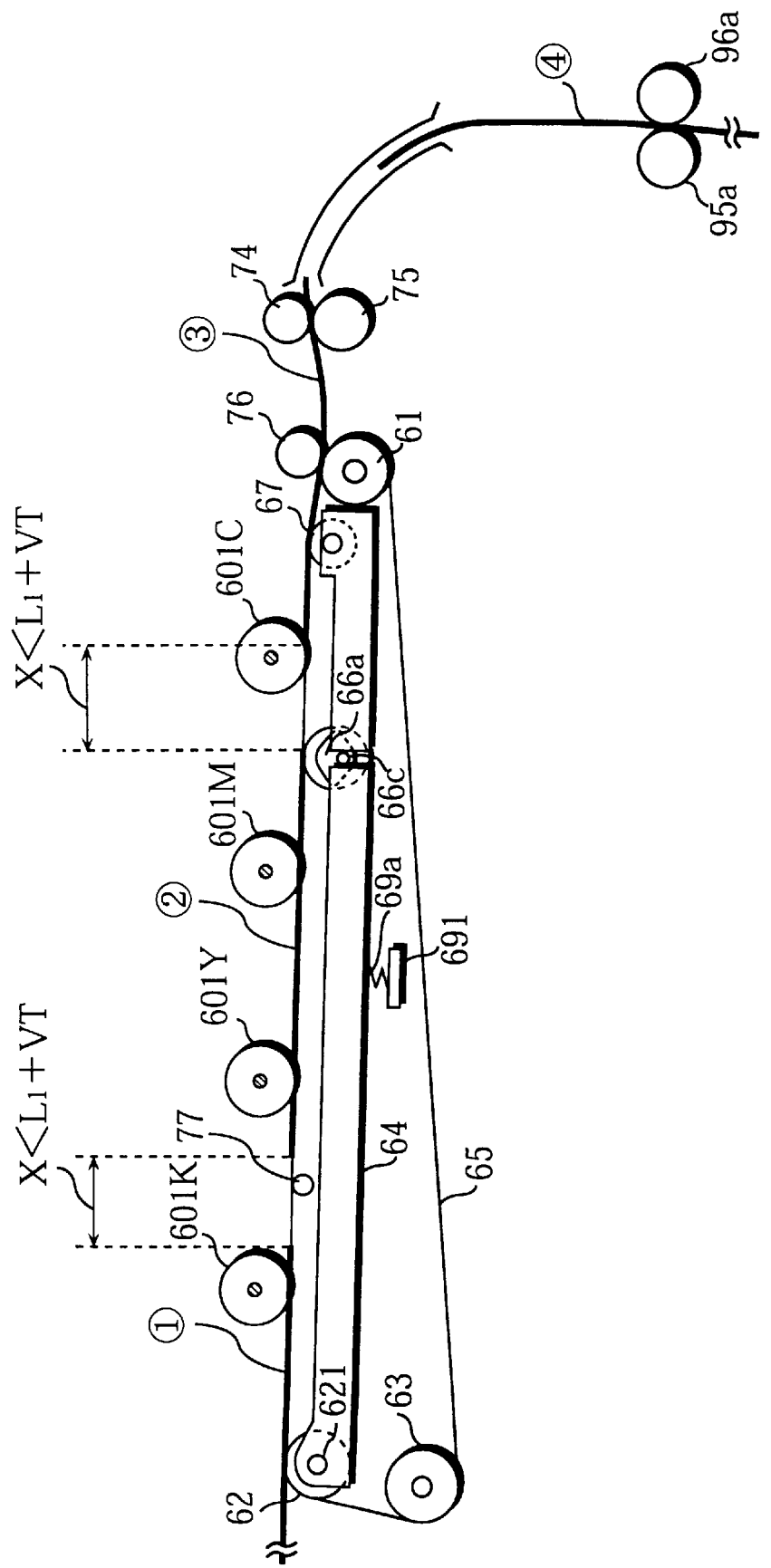
FIG. 8 shows a state around the printing unit 60 in the color mode.
Figure 9:
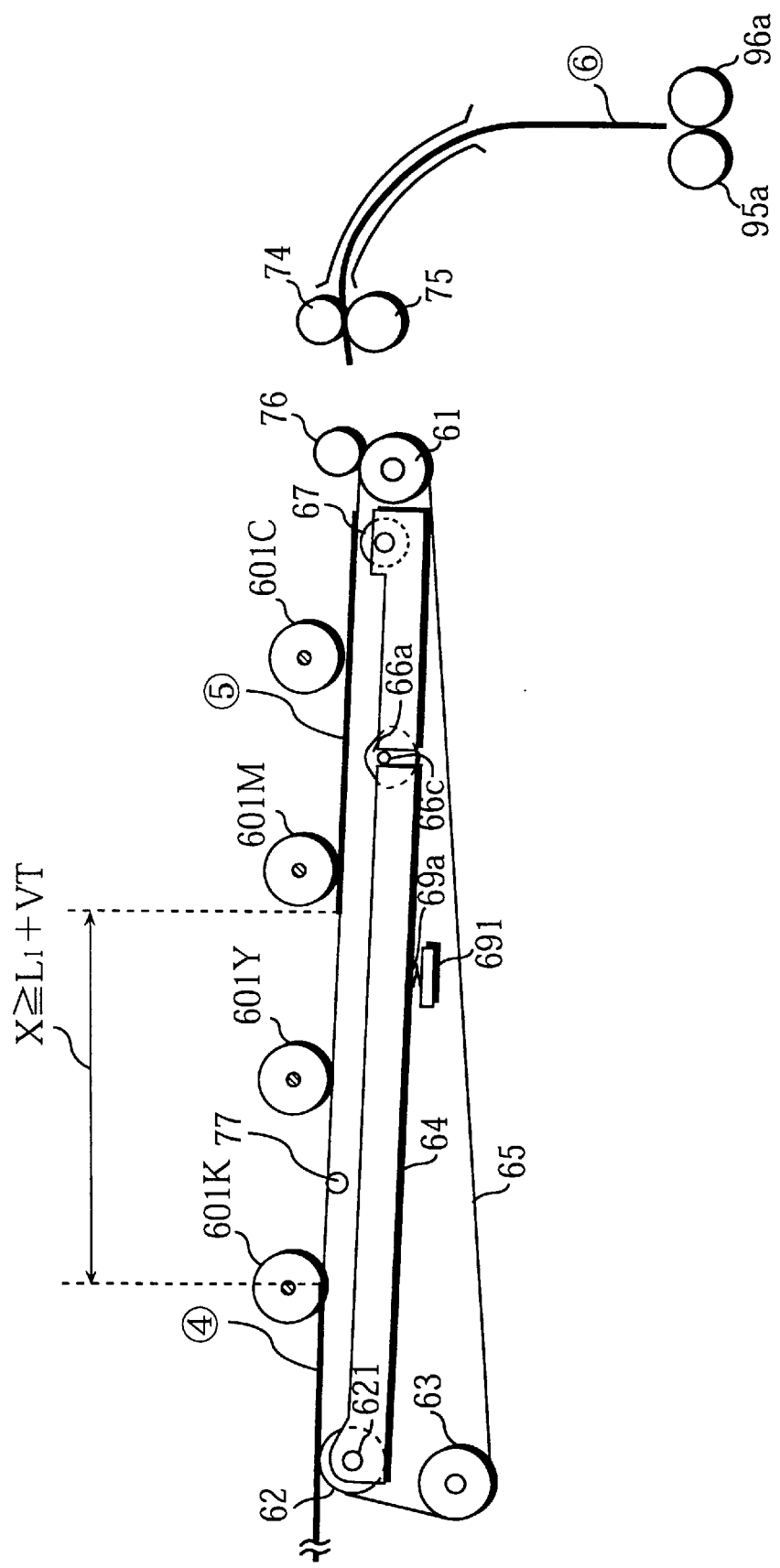
FIG. 9 shows a state around the printing unit 60 when the mode is switched from the color mode to the monochrome mode.
Figure 10:
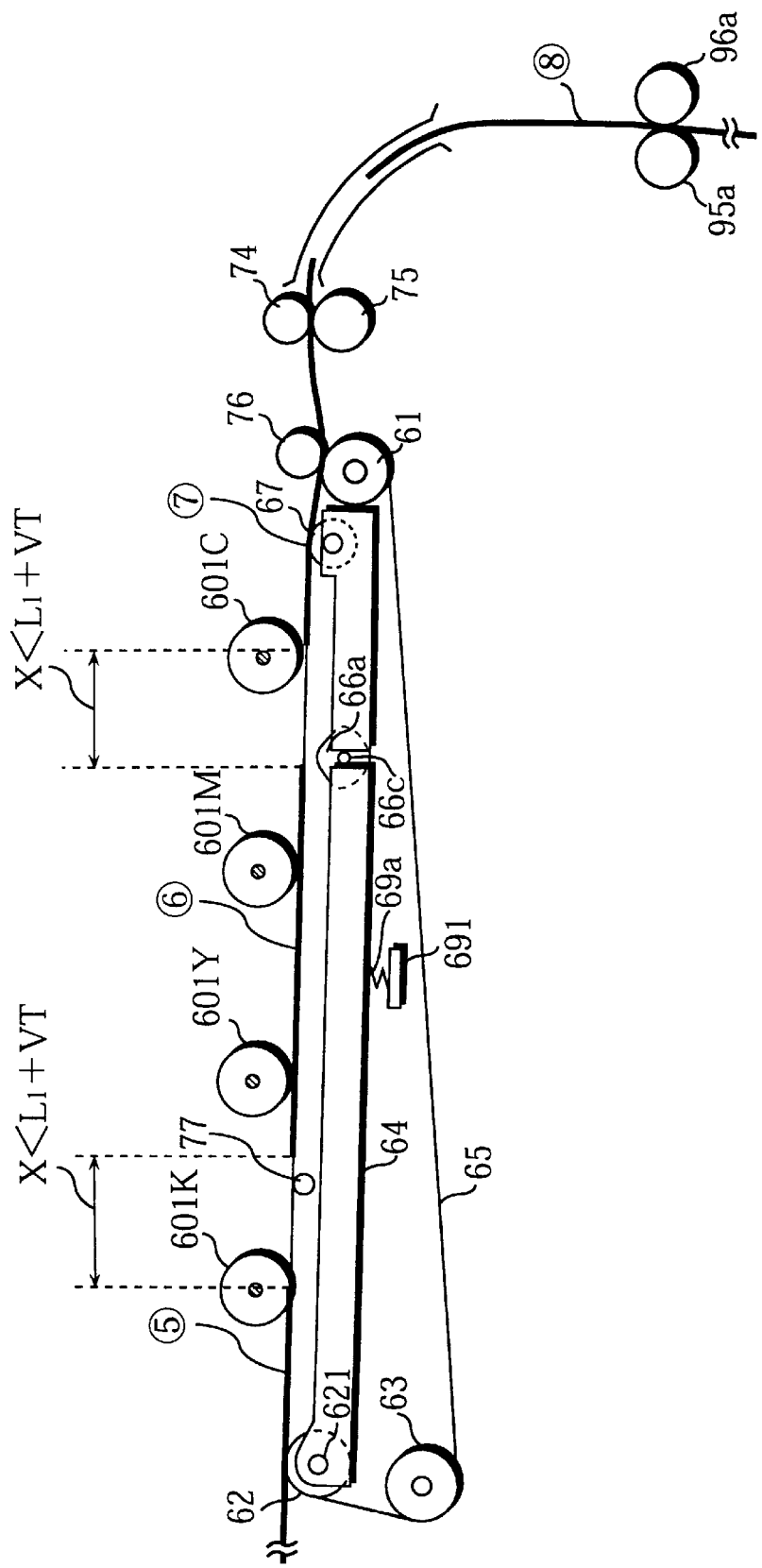
FIG. 10 shows a state around the printing unit 60 when the operation for switching the mode from the color mode to the monochrome mode is completed.

When the mode is switched from the color mode to the monochrome mode, the appearance around the printing unit 60 is changed from the appearance shown in FIG. 8 to that shown in FIG. 9 and then changed to that shown in FIG. 10. More specifically, the corresponding feeding and transporting rollers feed in the recording sheets ① to ⑧, and the distance between the recording sheets is adjusted by means of the synchronizing rollers 74 and 75. The recording sheets ① to ⑧ are sequentially transported to the transfer positions of the photosensitive drums 601C to 601K by the transporting belt 65, so that the image transfer is performed at each transfer position. FIG. 8 shows a state where the image transfer is performed on each of the recording sheets ① to ④ in the color mode before the mode is switched. FIG. 9 shows a state where the mode is switched from the color mode to the monochrome mode. FIG. 10 shows a state where the image transfer is performed on each of the recording sheets ⑤ to ⑧ in the monochrome mode after the mode is switched. Here, a distance between the recording sheets ④ and ⑤ shown in FIG. 9 is calculated according to the following equation. Note that the recording sheet ④ is the last sheet on which the color copying operation is performed in the corresponding successive operations, while the recording sheet ⑤ is the first sheet on which the monochrome copying operation is performed in the corresponding successive operations.

$$X \geq L_1 + VT \quad \text{(Equation 2)}$$

In Equation 2, "VT" is a distance moved by the transporting belt 65 during the frame separating operation. Here, "VT" is added to the right hand side of Equation 2, so that the image formation is not performed until the frame separating operation is completed. As a result, the unstable image formation due to the mechanical vibrations caused by the frame separating operation is prevented.

Meanwhile, the distance X (shown in FIGS. 8 and 10) between the recording sheets before and after the mode is switched from the color mode to the monochrome mode is calculated according to the following equation based on Equation 2.

$$X < L_1 + VT \quad \text{(Equation 3)}$$

The sheet distance control program is set so that the distance X is minimized in consideration of the efficiency in the processing speed of the image forming stations and in the transporting speed of the transporting belt 65. As a result, the high speed in the image forming processing is secured.

Figure 11:
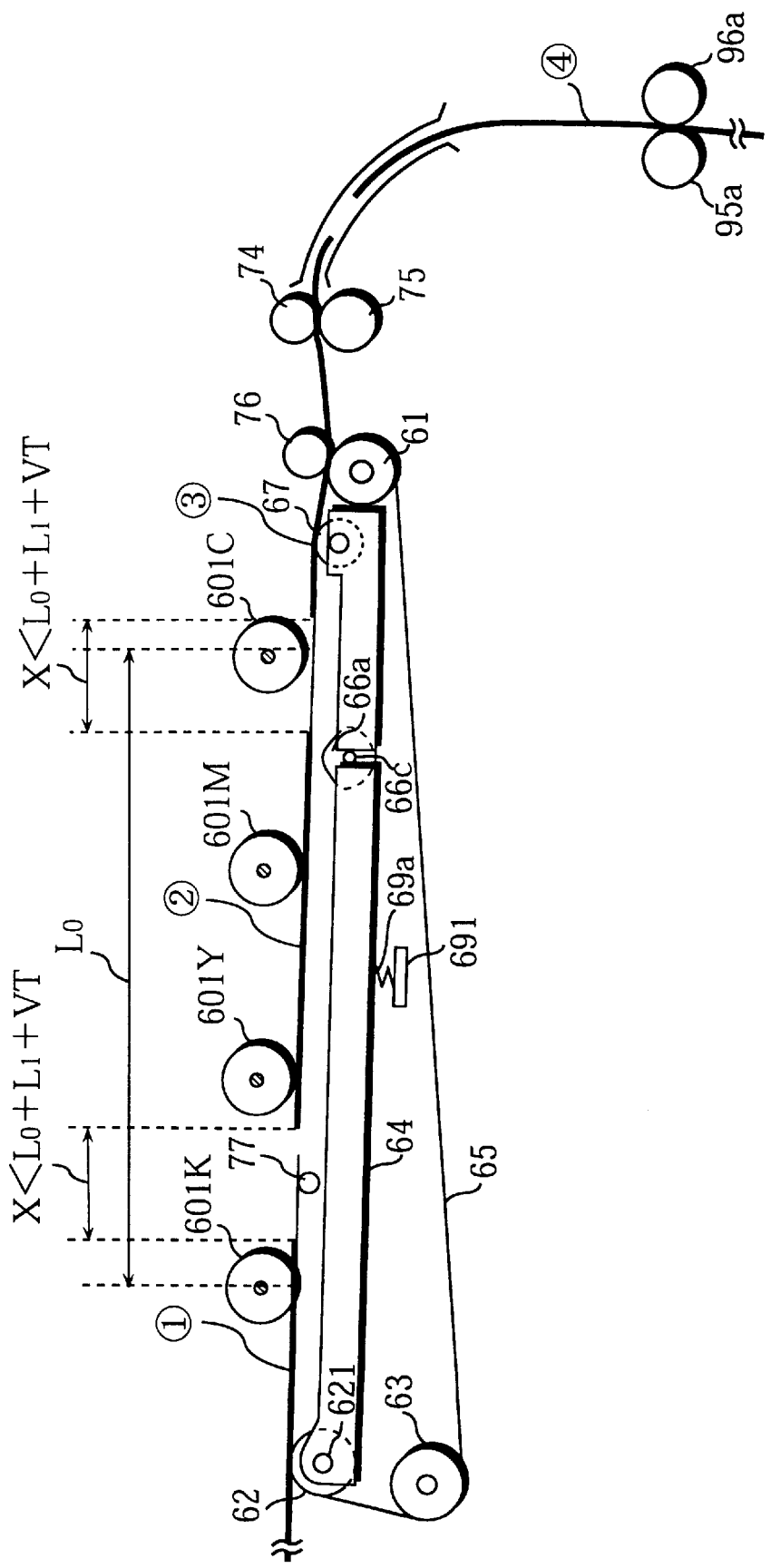
FIG. 11 shows a state around the printing unit 60 in the monochrome mode.
Figure 12:
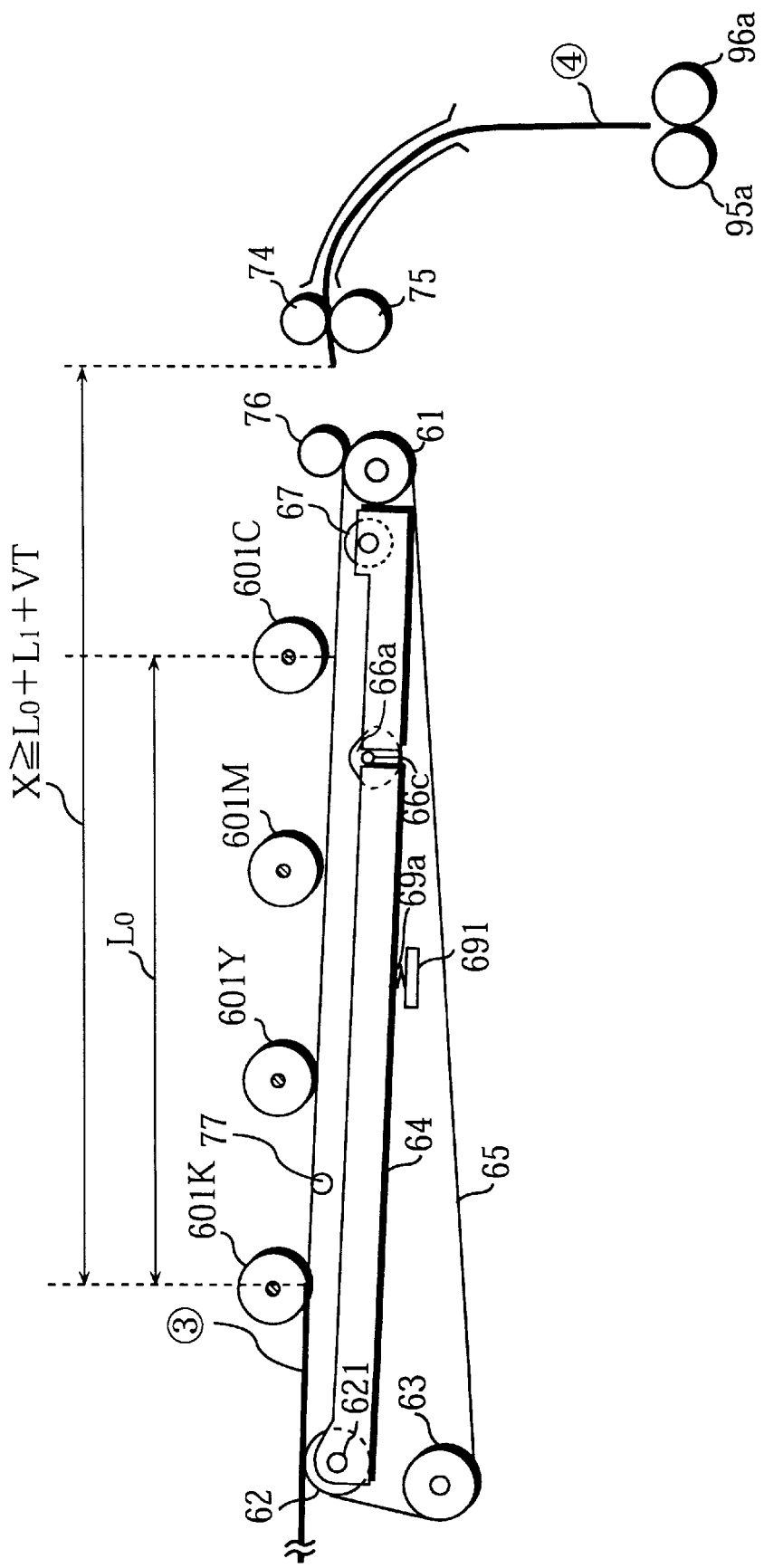
FIG. 12 shows a state around the printing unit 60 when the mode is switched from the monochrome mode to the color mode.
Figure 13:
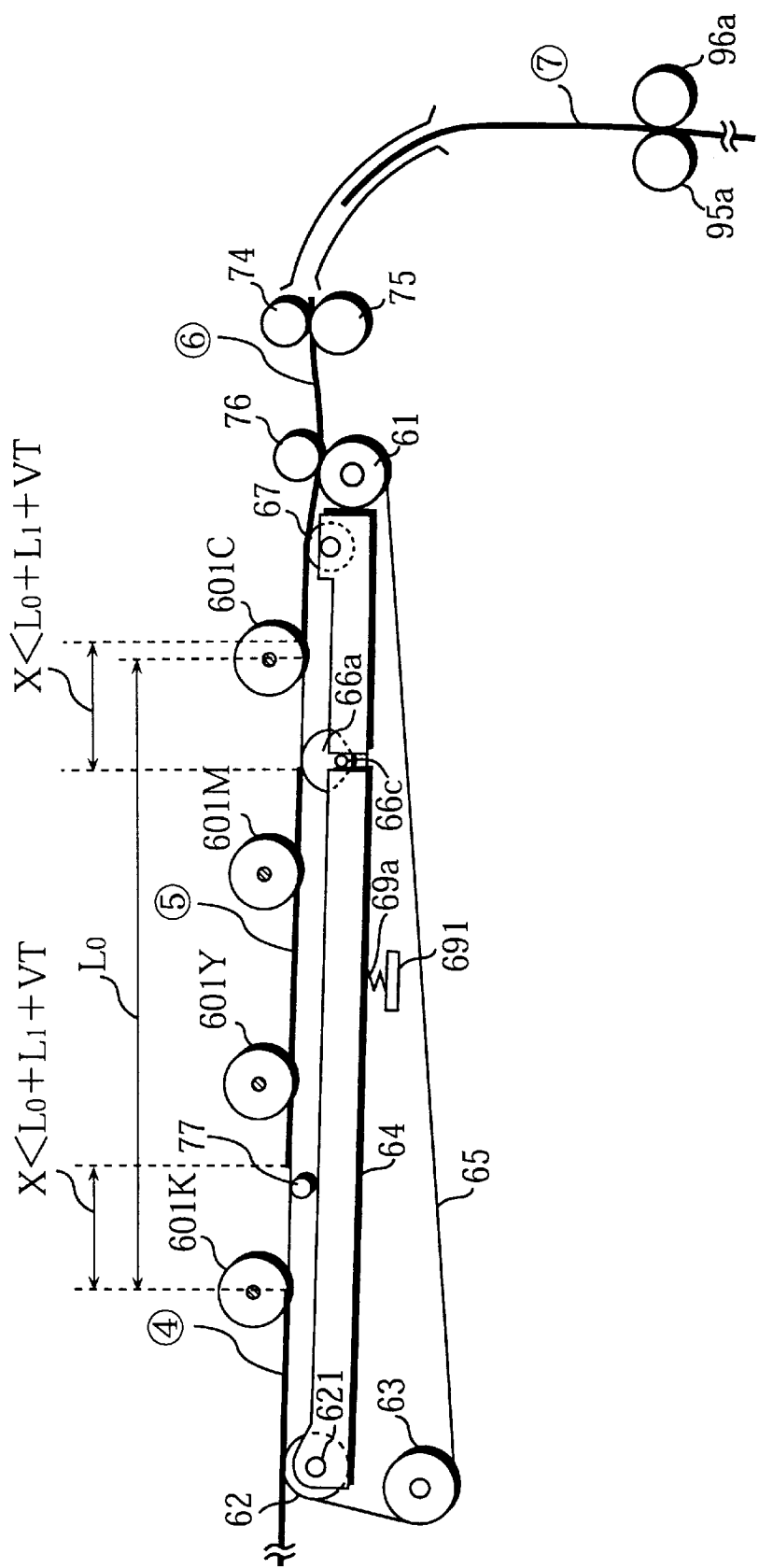
FIG. 13 shows a state around the printing unit 60 when the operation for switching the mode from the monochrome mode to the color mode is completed.

Next, when the mode is switched from the monochrome mode to the color mode, the appearance around the printing unit 60 is changed from the appearance shown in FIG. 11 to that shown in FIG. 12 and then changed to that shown in FIG. 13. Here, FIG. 11 shows a state where the image transfer is performed on each of the recording sheets ①  to ③ in the monochrome mode before the mode is switched. FIG. 12 shows a state where the mode is switched from the monochrome mode to the color mode. FIG. 13 shows a state where the image transfer is performed on each of the recording sheets ④ to ⑦ in the color mode after the mode is switched. Here, a distance between the recording sheets ③ and ④ shown in FIG. 12 is calculated according to the following equation. Note that the recording sheet ③ is the last sheet on which the monochrome copying operation is performed in the corresponding successive operations, while the recording sheet ④ is the first sheet on which the color copying operation is performed in the corresponding successive operations.

$$X \geq L_0 + L_1 + VT$$

Here, "$L_0$" is a distance between the shafts of the photosensitive drums 601C and 601K as shown in FIG. 12, and is required to secure the distance between the transfer position of the photosensitive drum 601K located at the most downstream side on the transporting belt 65 and the transfer position of the photosensitive drum 601C located at the most upstream side on the transporting belt 65.

The distance X (shown in FIGS. 11 and 13) between the recording sheets before and after the frame separating operation is performed is calculated according to the following equation based on Equation 4.

$$X < L_0 + L_1 + VT \quad \text{(Equation 5)}$$

As is the case stated above, the sheet distance control program stored in the ROM 507B is set so that the distance X is minimized.

The sheet distance control performed by the CPU 501B can be summarized as follows. When the frame 64 is shifted so that the mode is switched between the color mode and the monochrome mode, the respective certain distances are required between the recording sheets as explained above. Aside from the case where the frame 64 is shifted, the distance between the recording sheets is minimized to improve the processing speed.

Figure 14:
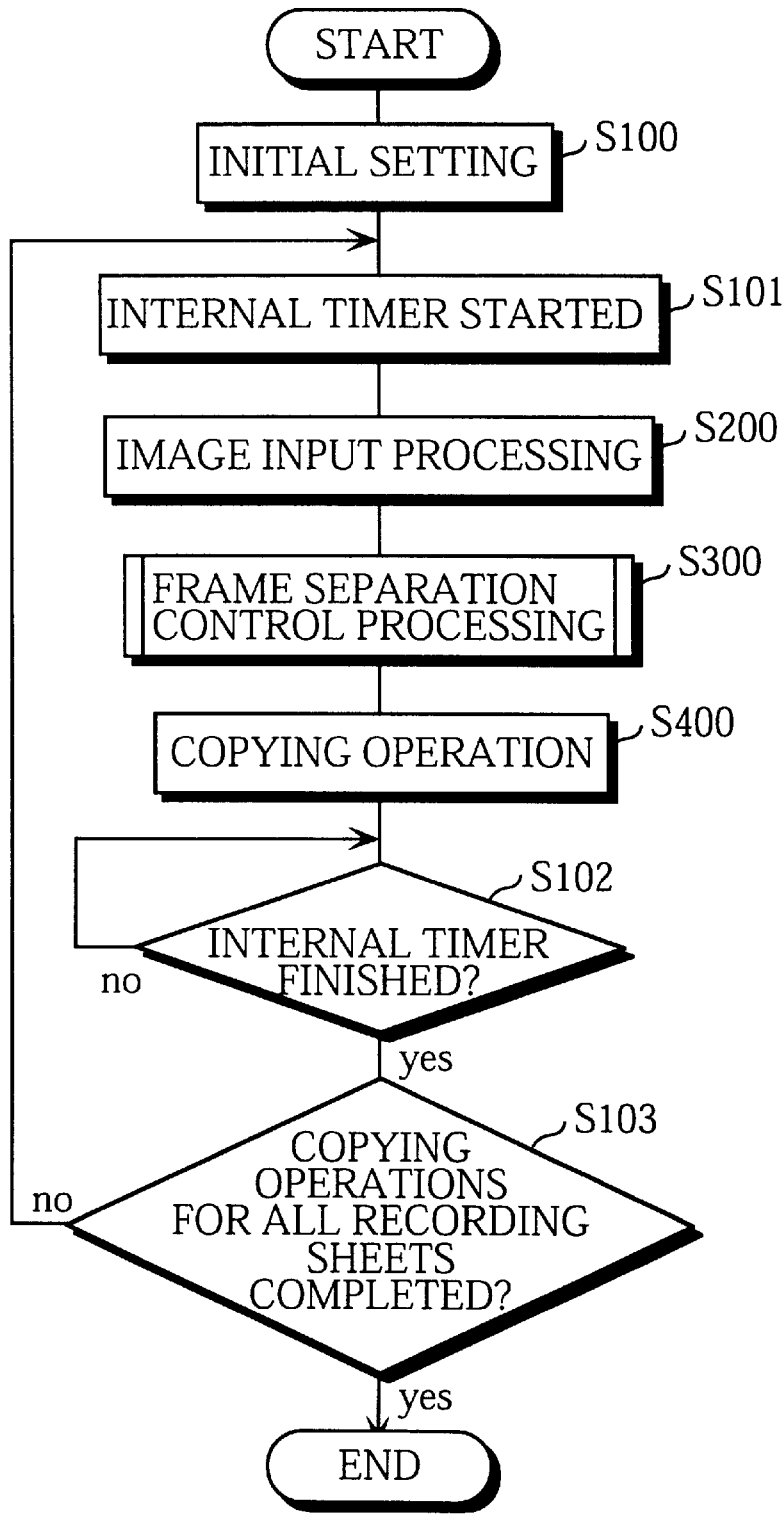
FIG. 14 is a flowchart showing the processing performed in the main routine of the apparatus.
Figure 15:
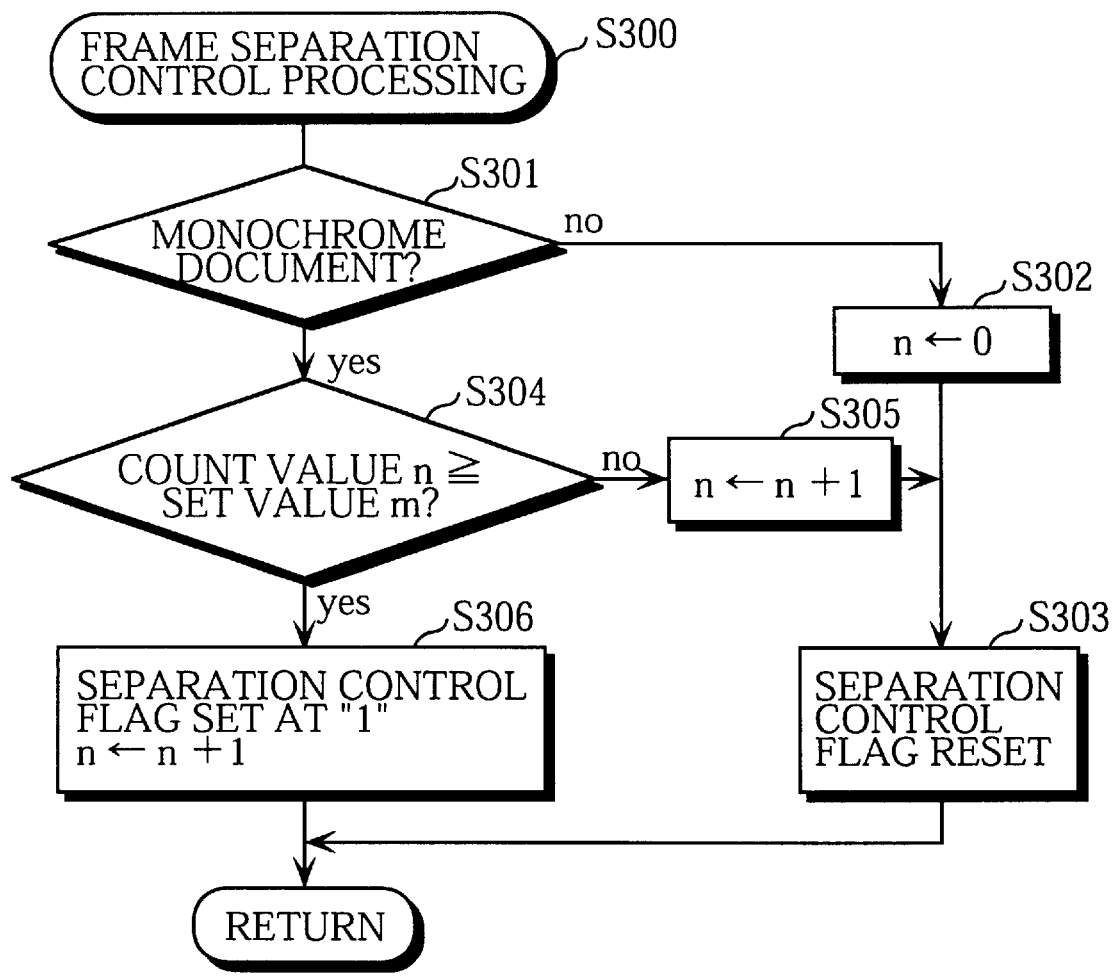
FIG. 15 is a flowchart showing the detailed processing to control the frame separation in the first embodiment.

The following is a description of the image forming operation performed by the copier having the stated construction, with reference to the flowchart of the main routine shown in FIG. 14 and the flowchart of the subroutine of the frame separating operation shown in FIG. 15. The operations performed by the copier of the present invention are different between when the document to be copied is color and when the document to be copied is monochrome, and therefore, the explanation is given for each case. For example, cases when the user sets one color document to make one copy of it and when the user sets one color document and one monochrome document together to successively make ten copies for each document are respectively described.

The former case is first described. For this copying operation, the user presses the color mode selection key 315 on the operation panel 30 to specify the color mode.

When the user presses the copy start key 313 on the operation panel 30, the first recording sheet is fed by the feeding roller 92a from the paper feeding cassettes 91a and stops immediately before the synchronizing rollers 74 and 75.

The programs which are stored in the ROM (not shown) of the controlling unit 40 and in the ROM 507B of the digital signal-processing unit 211 are set in the initial state (step S100). These programs are related to the stepping motor control, the sheet distance control, the frame separation control, and so on. Also, image data of the preceding document remained in the RAM 508B is deleted and a count value n of the monochrome copy counting unit 5012B is reset to "0" (step S100).

After the above initial setting, an internal timer of the controlling unit 40 starts counting (step S101), and simultaneously, the color document set on the document setting tray 101 of the automatic document feeder 10 is transported to a predetermined reading position of the platen glass 201.

The image of the color document is exposed by the exposure lamp 202 via the first sliding unit 204 and the second sliding unit 207 of the image reading unit 20, and is reflected off mirrors such as the mirrors 203, 205, and 206. Then, the image of the color document is read by the CCD scanner 209. Appropriate processes are performed by the timing controlling unit 502B and the shading correction unit 503B of the digital signal-processing unit 211 on the image data read by the CCD scanner 209. After the processes, the image data is temporarily stored in the RAM 508B of the digital signal-processing unit 211. This image input processing stated above is performed in step S200.

Next, the processing for controlling the frame separating operation is performed (step S300). FIG. 15 is a flowchart showing the processing for controlling the frame separating operation in the present embodiment. In this frame separating operation, after a detection sensor (the pair of photo couplers 610 and 611) detects the leading edge of the recording sheet, the image data stored in the RAM 508B for each of the colors R, G, and B is sequentially fetched and converted into the V data representing coordinates in the Munsell color system and the color difference data $W_R$ and $W_B$ by the HVC conversion unit 504B. The converted data is transmitted to the ACS unit 505B, which judges whether the document is color or monochrome (step S301). More specifically, the chroma calculating unit 5051B calculates the chroma signal W for each pixel, and the first comparing unit 5052B judges whether the pixel is chromatic or achromatic in accordance with the chroma signal W. The chromatic and achromatic pixels are separately counted by the chromatic pixel counter 5053B and the achromatic pixel counter 5054B. The second comparing unit 5055B calculates the ratio of the number of the chromatic pixels to the total number of the pixels in the page. In the present embodiment, if the calculated chromatic pixel ratio is equal to or above 0.1% of the total number of pixels in the page, the second comparing unit 5055B judges that the document is color ("No" in step S301). The CPU 501B proceeds to step S302, where the count value n of the monochrome copy counting unit 5012B in the CPU 501B is reset. The separation control flag is reset to "0" (step S303), so that the frame 64 is kept in the pressing state. That is, the transporting belt 65 is kept in contact with all of the photosensitive drums 601C to 601K. The CPU 501B then returns to the main routine.

It should be noted here that the detecting sensor detects the leading edge of the recording sheet before the second comparing unit 5055B judges whether the document to be copied is color or monochrome, so that the processes from step S301 to step S306 is performed once for each recording sheet. If each recording sheet is not reliably detected, the routine is repeatedly performed during the processing for one recording sheet. As a result, the count value n is unnecessarily incremented. The detection of the leading edge of the recording sheet before the recording sheet is judged to be color or monochrome prevents this problem from occurring.

The copying operation is performed in step S400 of the main routine shown in FIG. 14. In the copying operation, more specifically, the correction processes are performed by the image correction units, such as the UCR-BP unit, the masking unit, and the γ correction unit on the image data for each color outputted from the shading correction unit 503B before the image data is converted into the image data for each of the colors C, M, Y, and K. The image data for each of the colors C, M, Y, and K is transmitted to the controlling unit 40, where the image data is next converted into laser beams corresponding to the reproduction colors. The laser beams are emitted from the laser diodes 512C to 512K to strike the polygon mirror 501, and then respectively expose the corresponding surfaces of the photosensitive drums 601C to 601K through respective light paths. The surfaces of the photosensitive drums 601C to 601K are previously charged by the chargers 602c to 602K, so that toner images are formed on the surfaces of the photosensitive drums 601C to 601K, with toner being supplied by the developing units 603C to 603K. By means of electric fields produced by the transfer brushes 604C to 604K, the toner images are sequentially transferred onto the recording sheet at the correct position. After the image transfer, the recording sheet is separated from the surface of the transporting belt 65 by means of an electric field produced by the separating charger 69. Toner particles forming the image on the recording sheet are fixed by the fixing unit 80. Finally, the recording sheet is discharged onto the discharging tray 78. Charges on the upper and lower surfaces of the transporting belt 65 are eliminated by the charge eliminator 609. The belt cleaner 68 cleans the surface of the transporting belt 65. After this, the CPU 501B waits for the internal timer to finish. When the internal timer finishes counting ("Yes" in step S102), this means that the copying operation for one recording sheet is completed.

The case where one copy is made from one color document has been accordingly explained. When only one copy is made from one document as in this case, the copying operation is not repeated. Basically in the same way, one copy is made from one monochrome document and the frame separating control is not performed by the CPU 501B.

Next, the following is a description of the latter case where the user sets one color document and one monochrome document together in this order on the document setting tray 101 and inputs the setting using the operation panel 30 to successively make ten copies for each document. Note that the description of an operation which is common to the former and latter cases is omitted to clarify a difference of operations performed in the copier between the two cases.

When the user specifies the setting using the operation panel 30 and presses the copy start key 313, the first recording sheet is fed and stops immediately before the synchronizing rollers 74 and 75 (step S100). Also, the initial setting is performed on the controlling unit 40 and the digital signal-processing unit 211 (step S100).

Then, the internal timer starts counting (step S101). The image reading unit 20 reads the image of the document. The image correction processes, such as the shading correction, are performed by the digital signal-processing unit 211 on the image data of the document for each of the colors R, G, and B. The image data is then temporarily stored in the RAM 508B. This image input processing stated above is performed in step S200.

The CPU 501B proceeds to the processing to control the frame separation (step S300) and to step S301 of the subroutine shown in FIG. 15. After the detection sensor (the pair of photo couplers 610 and 611) detects the leading edge of the recording sheet, the ACS unit 505B judges whether the document is color or monochrome from the image data stored in the RAM 508B. Since the present document is color, the count value n of the monochrome copy counting unit 5012B is reset to "0" (step S302) and the separation control flag is also reset (step S303). Then, the color copying operation is performed on the first recording sheet in step S400 of the main routine. After the processing up to step S102 is completed, the color copying operation is performed on next nine recording sheets in the same way. Here, the CPU 501B performs the control operations such as controlling the rotational speed of the synchronizing rollers 74 and 75 so that the distance between the recording sheets satisfies Equation 3.

Following completion of the color copying operation for the ten recording sheets, the monochrome copying operation is performed. The monochrome copying operation for the first recording sheet is performed in processes from step S101 to step S300 in the same way as stated in the color copying operation. The CPU 501B then proceeds to the processing to control the frame separation in step S300. In the subroutine shown in FIG. 15, after the detection sensor (the pair of photo couplers 610 and 611) detects the leading edge of the recording sheet, the ACS unit 505B judges whether the document is color or monochrome. Then, the second comparing unit 5055B judges that the ratio of the number of the chromatic pixels to the total number of the pixels in the page is below 0.1%, and the document is judged to be monochrome ("Yes" in step S301).

The CPU 501B proceeds to step S304 to compare the count value n of the monochrome copy counting unit 5012B to the set value m (m=3) stored in the ROM 507B. Since the count value n is currently "0", the CPU 501B proceeds to step S305 to increment the value by "1" (i.e., the count value n is "1"). The separation control flag of the CPU 501B is reset (step S303) and the CPU 501B returns to the main routine. Then, the monochrome copying operation is performed (step S400), with the frame 64 being in the pressing state. When the internal timer finishes counting ("Yes" in step S102), the CPU 501B judges whether the copying operation is performed on all of the corresponding recording sheets (step S103). Since the copying operation has been finished only for the first recording sheet, the CPU 501sB returns to step S101.

In the monochrome copying operation performed on the second recording sheet, the count value n which is currently "1" is compared to the setting value m. The count value n is still smaller than the setting value m, so that the CPU 501B proceeds to step S305 to increment the value by "1" (i.e., the count value n is "2") and the separation control flag is reset (step S303). Then, the CPU 501B returns to step S400 of the main routine, where the monochrome copying operation is performed with the frame 64 being in the pressing state. When the internal timer finishes counting ("Yes" in step S102), the CPU 501B judges whether the copying operation is performed on all of the corresponding recording sheets (step S103). Since the copying operation has been finished for the two recording sheets, the CPU 501B returns to step S101 again.

In the same way, the monochrome copying operation is performed on the third recording sheet. The count value n is incremented by "1" (i.e., the count value n is "3").

From the monochrome copying operation for the fourth recording sheet, the processing of the subroutine shown in FIG. 15 changes. The CPU 501B judges that the count value n is equal to the setting value m in step S304. In step S306, the count value n is incremented by "1" (i.e., the count value n is "4") and the separation control flag is set. As a result, the frame separation control is performed by the frame separation controlling unit 5011B of the CPU 501B through the CPU of the controlling unit 40. Specifically, the transporting belt 65 is separated from the photosensitive drums 601C to 601Y and the rotation of these photosensitive drums are stopped. Then, the controlling unit 40 controls the rotational speed of the synchronizing rollers 74 and 75 so that the distance between the third and fourth recording sheets satisfies Equation 2. Accordingly, the distance between the two recording sheets is kept appropriate and the monochrome copying operation is performed on the fourth recording sheet, with the transporting belt 65 being in contact with only the photosensitive drum 601K.

After the monochrome copying operation for the fourth recording sheet, the internal timer finishes counting ("Yes" in step S102) and the CPU 501B judges whether the copying operation is performed on all of the corresponding recording sheets (step S103). Then, the CPU 501B returns to step S101 again.

In the monochrome copying operations for the next six recording sheets, the CPU 501B controls the distance between these six recording sheets, which are successively transported, to satisfy Equation 3. These monochrome copying operations are performed in the separated state. When the CPU 501B judges that the monochrome copying operation is respectively performed on all of the corresponding recording sheets ("Yes" in step S103), the main routine is terminated.

The following is a description of a case where the mode is changed from the monochrome mode to the color mode in contrast to the stated case, although the detailed explanation is omitted. When the next document is judged to be color ("No" in step S301), the count value n is reset (step S302) and the separation control flag in the CPU 501B is reset to "0". Here, the value of the separation control flag is changed from "1" to "0", so that the frame separation controlling unit 5011B of the CPU 501B changes the state of the frame 64 from the separated state to the pressing state through the CPU of the controlling unit 40. As a result, the transporting belt 65 comes in contact with all of the photosensitive drums 601C to 601K. Here, note that the CPU 501B controls the distance between the last recording sheet in the preceding monochrome copying operations and the first recording sheet in the color copying operations to satisfy Equation 4.

Second Embodiment

The following is a description of the copier used in the second embodiment of the present invention. In the second embodiment, a time period taken until completion of the monochrome copying operation is counted and the state of the frame 64 is changed from the pressing state to the separated state when the counted time period exceeds a predetermined time period. The construction of the copier of the second embodiment is the same as the construction of the copier of the first embodiment, except that a monochrome copy timer (not shown) takes the place of the monochrome copy counting unit 5012B in the CPU 501B of the digital signal-processing unit 211 in the first embodiment. As such, the detailed explanation of the common components is omitted.

Figure 16:
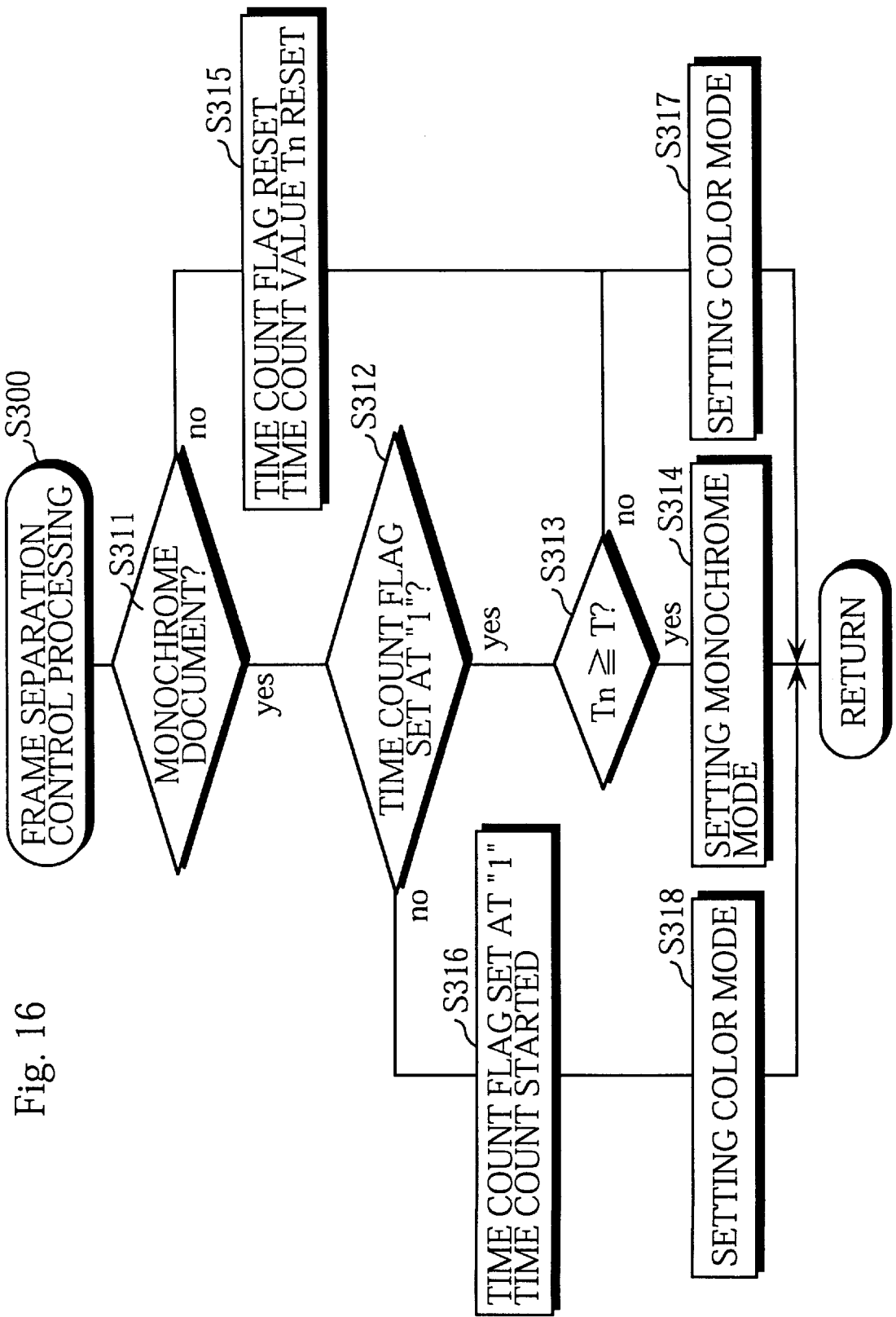
FIG. 16 is a flowchart showing the detailed processing to control the frame separation in the second embodiment.

The monochrome copy timer starts counting when the ACS unit 505B judges that the document to be copied is monochrome and a time count flag in the CPU 501B is set at "1" in the subroutine for the frame separation control shown in FIG. 16. This subroutine is described later in this specification. The time counting operation is continued until the time count flag is reset to "0".

The CPU 501B has a predetermined comparison count value (referred to "T") to compare it to a count value of the monochrome copy timer. This comparison count value is the standard time used for judging whether the state of the frame 64 should be changed from the pressing state to the separated state. In the present embodiment, the comparison count value T is set at 40 seconds.

The operation of the copier of the second embodiment is explained below, with reference to the main routine shown in FIG. 14 and the subroutine of the frame separation control processing shown in FIG. 16. As one example, a case where the user sets one color document and one monochrome document and specifies to make ten copies for each document is described.

When the user presses the copy start key 313, the first recording sheet is fed and stops immediately before the synchronizing rollers 74 and 75 (step S100). Also, the initial setting is performed for the controlling unit 40 and the digital signal-processing unit 211 (step S100).

The internal timer starts counting (step S101) and the image reading unit 20 reads image data of the color document for each of the colors R, G, and B. The image correction processes, such as the UCR-BP, are performed on the read image data by the digital signal-processing unit 211. The image data is then temporarily stored in the RAM 508B. This image input processing stated above is performed in step S200.

The CPU 501B proceeds to the frame separation control processing (step S300) and to step S311 of the subroutine shown in FIG. 16. The ACS unit 505B judges whether the document is color or monochrome (step S311). Since the current document is color, the CPU 501B proceeds to step S315 where the time count flag is reset to "0" and the time count value Tn is reset to "0". With this state of the CPU 501B, the mode is set in the color mode (step S317) and CPU 501B returns to the main routine.

In this way, the color copying operation is performed on the first recording sheet. The color copying operation is also performed on next nine recording sheets, with the distance between the recording sheets being controlled by the components such as the CPU 501B to satisfy Equation 3.

Following completion of the color copying operation for the ten recording sheets, the copying operation is changed from the color copying operation to the monochrome copying operation. The processing performed here is explained, with reference to FIG. 16 mainly.

In the frame separation control processing (step S300), the document is judged to be monochrome ("Yes" in step S311). The CPU 501B proceeds to step S312 to judge whether the time count flag is set at "1". The present monochrome copying operation is performed on the first recording sheet out of ten recording sheets. As such, the time count flag is currently set at "0". The CPU 501B proceeds to step S316 to set the time count flag at "1", and simultaneously, the monochrome copy timer of the CPU 501B starts counting. Then, the CPU 501B proceeds to step S318 to set the mode still in the color mode and returns to the main routine. With this state, the monochrome copying operation is performed on the first recording sheet.

For the second recording sheet, the processing up to step S311 is the same as for the first recording sheet. The CPU 501B proceeds to step S312 to check that the time count flag is set at "1". The CPU 501B then judges whether the time count value Tn is equal to or above the comparison count value T (T=40) (step S313). Suppose that about 10 seconds have elapsed until the CPU 501B reaches step S312 in the processing performed for the second recording sheet from when the monochrome copy timer started counting in step S316 in the processing for the first recording sheet. The time count value Tn has not reached the comparison count value T ("No" in step S313) and the CPU 501B proceeds to step S317 to set the mode still in the color mode as is the case of the first recording sheet. With this state, the monochrome copying operation is performed on the second recording sheet (step S400). As described above, the time required for the monochrome coping operation in the color mode is about 10 seconds per recording sheet. This is to say, the copying operation is performed in the same way until completion of the copying operation for the fourth recording sheet, i.e., until the time count value Tn reaches the comparison time value T.

The processing changes when the monochrome copying operation is performed on the fifth recording sheet. More specifically, Tn≧T is satisfied ("Yes" in step S313) and the CPU 501B proceeds to step S314 where the mode is set in the monochrome mode. Accordingly, the monochrome copying operation is performed in the monochrome mode from the fifth recording sheet onward. For the sixth to tenth recording sheets, the copying operation is respectively performed in the monochrome mode (step S400) as stated above after the processes from steps S311 to S314.

Third Embodiment

In the first and second embodiments, the number of copies having been made from the monochrome document or the time period having taken for the monochrome copying operation is counted. The mode is changed from the color mode to the monochrome mode when the respective counted values reach the corresponding predetermined values, so that the transporting belt 65 is separated from the image forming stations aside from the image forming station used for forming a black toner image. The third embodiment is different from these two embodiments. More specifically, the CPU 501B has each of documents be judged to be color or monochrome before the image formation and stores the order of the documents and the number of copies to make for each document. In accordance with this information, the mode is switched between the color mode and the monochrome mode when necessary.

The following is a description of the copier of the third embodiment. The copier of the third embodiment is the same as the copier of the first embodiment, except for the construction of the CPU 501B. Therefore, the explanation of the common components is omitted. However, since the pre-scanning needs to be performed in the present embodiment as stated above, a recycle document handler (referred to as the "RDH" hereinafter) is provided for the copier as a matter of convenience in addition to the construction described in the first embodiment. By means of the RDH, all of the documents are sequentially transported to the predetermined reading position and the image is read for each document. The ACS unit 505B judges for each document whether it is color or monochrome, and the judgement result can be stored in the RAM 508B. Here, the image data of each of the documents does not need to be fully read and the image to be read may be reduced to a certain extent. By doing so, each document can be judged whether it is color or monochrome at a high speed.

When the RDH is not provided, the copier of the third embodiment can be realized using a mass memory. More specifically, the image data may be read for each document before the image formation and stored in the mass memory. By referring to the image data stored in the mass memory, the ACS unit 505B may judge for each document whether it is color or monochrome. In addition, the image data stored in the mass memory can be used for the image formation.

The CPU 501B includes the frame separation controlling unit 5011B and a copying order storage unit (not shown) to entirely control the operation performed by the components of the printing unit 60.

The substance of the copying order storage unit is the RAM 508B. The copying order storage unit stores color judging information and numbering information R (a number in the order) for each of the recording sheets on which the image of the corresponding document is reproduced. More specifically, the copying order storage unit has a table as shown in FIG. 17, the table including an address 36a corresponding to a memory area group 36b which stores information regarding the mode for each of n recording sheets. Although the number of the recording sheets is referred to as "n" here, it is desirable that data of at least a few tens of recording sheets can be stored in practical. In the address 36a, the numbering information R is stored for each of the n recording sheet. The numbering information R does not represent a number of each recording sheet in the order of the image forming operations performed for one of the documents set by the user, but represents a number of each recording sheet in the order of the image forming operations performed for all of the documents.

As shown in the table of FIG. 17, the memory area group 36b corresponding to the address 36a stores information as to whether the mode to be operational is the monochrome mode or the color mode for each recording sheet. This information is represented by a setting state of a monochrome mode flag. In the present embodiment, when monochrome copying operations are successively performed on at least a predetermined number of the recording sheets, the separation control flag is set at "1", so that the frame separating operation is performed. Meanwhile, when the monochrome copying operations are performed on less than the predetermined number of the recording sheets or when the color copying operation is performed, the separation control flag is reset to "0". The value of the separation control flag is stored as the monochrome mode flag in the memory area group 36b for each recording sheet. The predetermined number of the recording sheets is set at "2" in the present embodiment. Therefore, when the monochrome copying operations are successively performed on two recording sheets, the monochrome mode flag is set.

In accordance with the stated information stored in the copying order storage unit, the CPU 501B sets the mode in the monochrome mode via the frame separation controlling unit 5011B immediately before the monochrome image forming operations are successively performed on two recording sheets or more.

Figure 19:
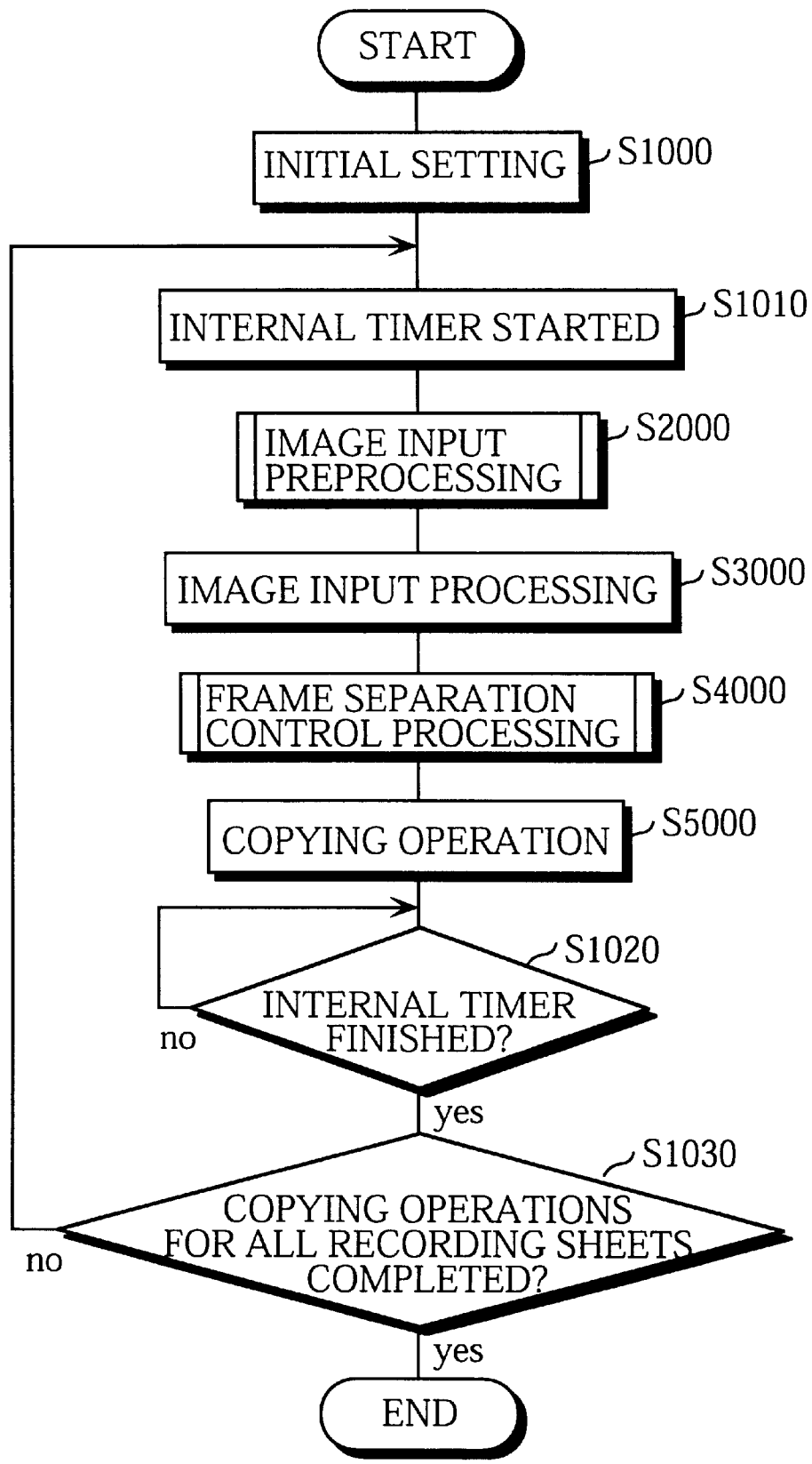
FIG. 19 is a flowchart showing the processing performed in the main routine in the third embodiment.
Figure 20:
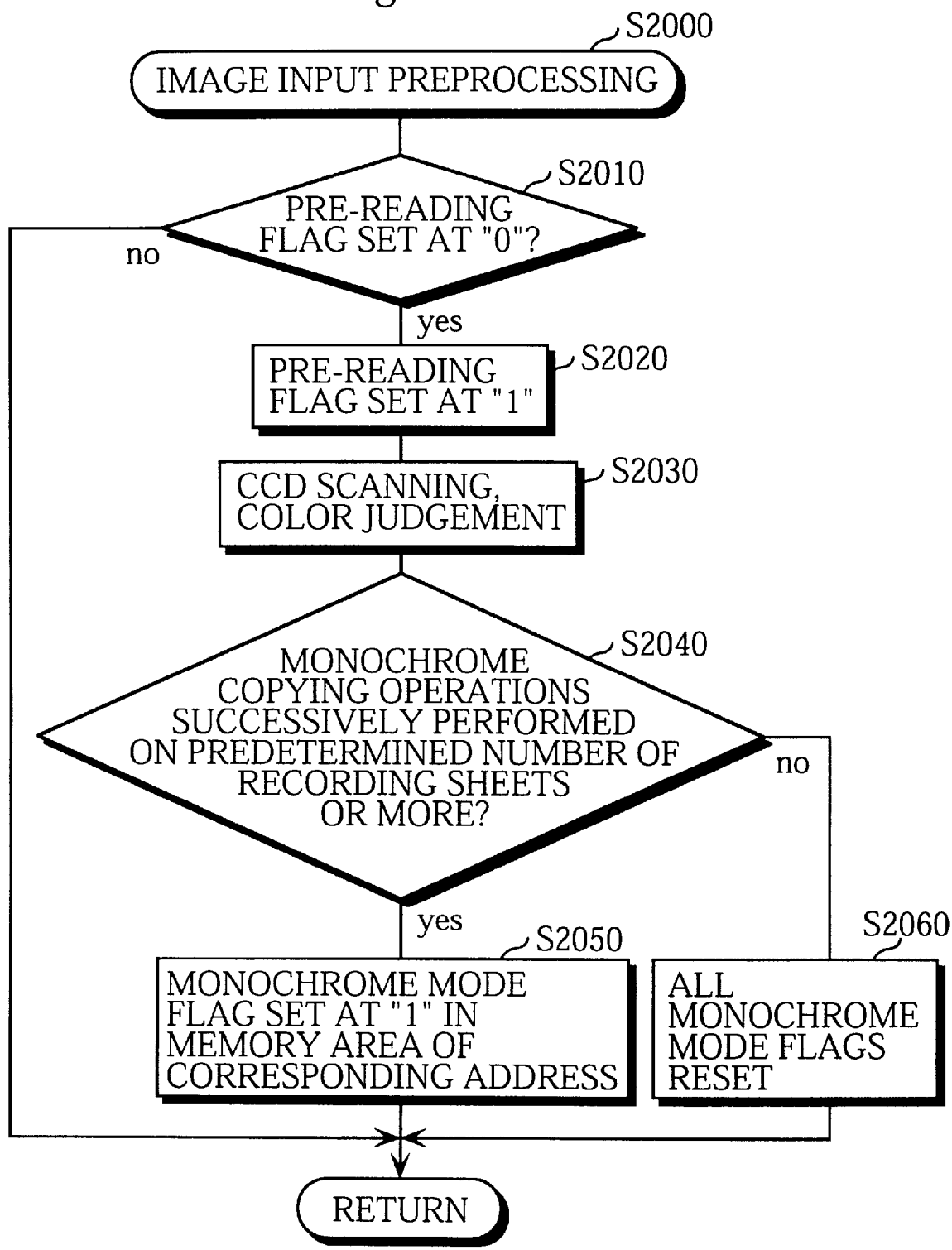
FIG. 20 is a flowchart showing the detailed image input preprocessing.
Figure 21:
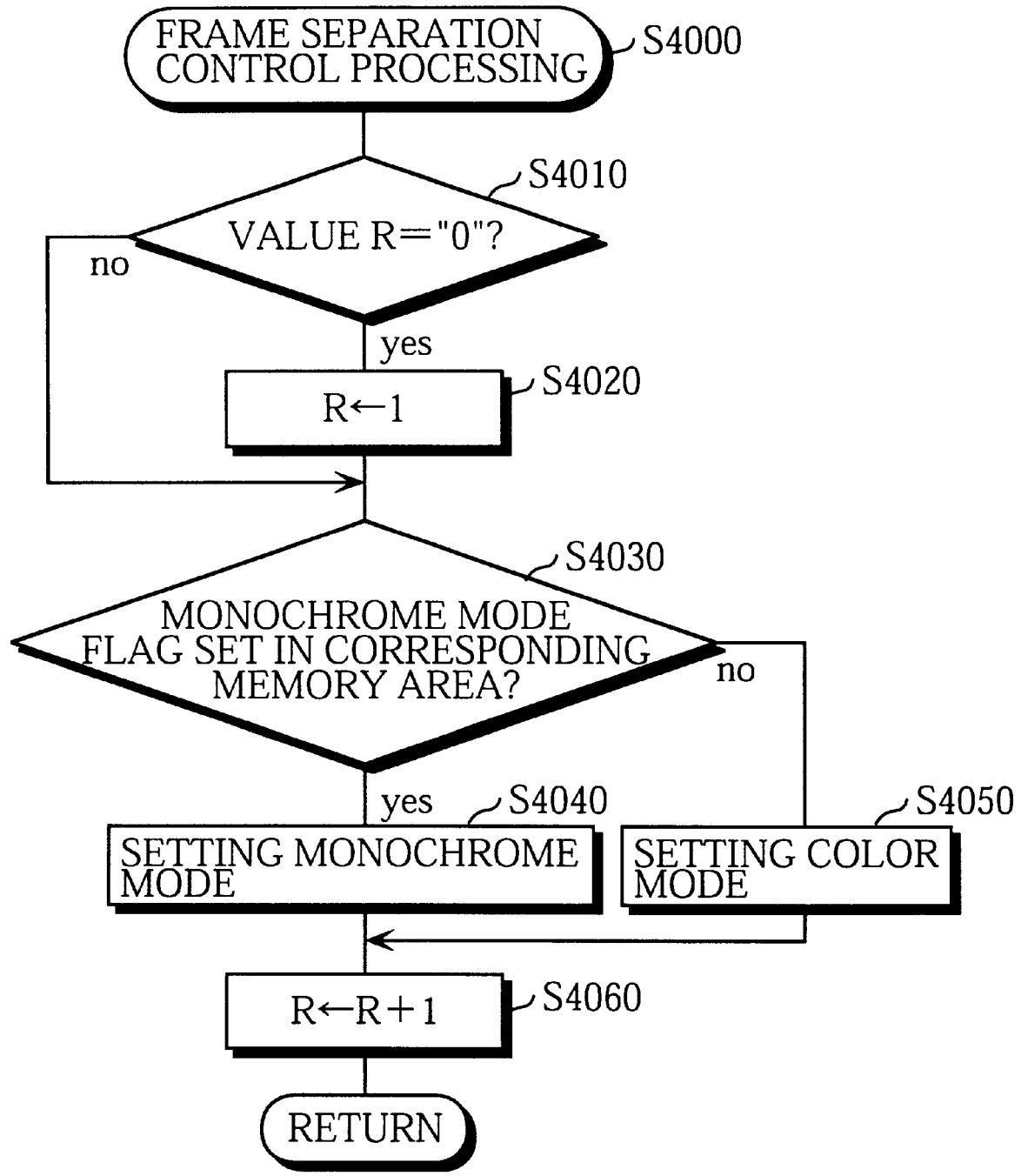
FIG. 21 is a flowchart showing the detailed processing to control the frame separation in the third embodiment.

The following is a description of a case where the user sets a color document, a monochrome document, and a color document in this order and specifies to make two copies for each document, with reference to the table of FIG. 18 stored in the copying order storage unit, the main routine shown in FIG. 19, the subroutine of FIG. 20 showing the image input preprocessing of step S2000, and the subroutine of FIG. 21 showing the processing for the frame separation control of step S4000.

When the user sets the three documents and presses the copy start key 313 on the operation panel 30, all of the flags in the CPU 501B are reset to "0" in the initial setting, and simultaneously, information remaining in the memory area group 36b of the copying order storage unit is deleted (step S1000 in the main routine of FIG. 19). Also, the programs required for the various control operations are initialized (step S1000).

The internal timer starts counting (step S1010), and the CPU 501B then proceeds to step S2000 for the image input preprocessing. In the subroutine shown in FIG. 20, the CPU 501B judges whether a document pre-reading flag is set at "0" (step S2010). Since the document has not been read, i.e., the document pre-reading flag is currently set at "0", the CPU 501B proceeds to step S2020 to set the flag at "1". According to another program, the image reading unit 20 pre-reads the image data of the n documents (three documents in this case) set by the user and the color judgement is made for each document by the ACS unit 505B of the digital signal-processing unit 211 (step S2030). In accordance with the color information of each of the n documents which has been pre-read, the CPU 501B judges whether the monochrome copying operations are to be successively performed on at least two recording sheets out of all of the recording sheets on which the corresponding images are to be respectively reproduced (step S2040). In the present example, the second document is monochrome, and the monochrome copying operations will be successively performed on the third and fourth recording sheets out of total six recording sheets. Thus, the CPU 501B proceeds to step S2050 to respectively set the monochrome mode flag in the memory area group 36b of the address 36a corresponding to the third and fourth recording sheets.

The table of the copying order storage unit which is shown in FIG. 18 stores information regarding the six recording sheets, on each of which the corresponding image out of the three documents is respectively reproduced. As shown in the table, the monochrome mode flag is set at "1" in memory areas 373b and 374b corresponding to addresses 373a and 374a of the third and fourth recording sheets. Meanwhile, if all of the documents set by the user are judged to be color or if the monochrome copying operations are to be performed on less than the predetermined number of recording sheets (i.e., if the monochrome copying operation is to be performed on one recording sheet in the present example), the CPU 501B proceeds to step S2060 to delete all of the monochrome mode flags.

After the setting process of the monochrome mode flag, the CPU 501B returns to the main routine shown in FIG. 19 and the image input processing is performed in step S3000, where the image correction processes are performed on the read image data of the first document and the image data is temporarily stored in the RAM 508B.

The CPU 501B proceeds to step S4000 to control the frame separation. FIG. 21 shows the subroutine of the frame separation control processing. The CPU 501B judges whether the detection sensor (the pair of photo couplers 610 and 611) detects the leading edge of the recording sheet and also judges whether a value R representing the number in the order is "0" (step S4010). Since the value R has not yet been counted ("Yes" in step S4010), the CPU 501B starts counting and sets the value at "1" (step S4020).

Then, the CPU 501B refers to the table of the copying order storage unit to judge whether the monochrome mode flag is set in the memory area corresponding to this value R (i.e., "1" at this time). Since the present processing is performed for the first document which is color, the monochrome mode flag is not set in the memory area 371b ("No" in step S4030) as shown in FIG. 18. Thus, the mode is set in the color mode (step S4050). The value R is incremented by "1" (i.e., R="2") (step S4060), and the CPU 501B returns to the main routine shown in FIG. 19 to have the copying operation be performed in the color mode (step S5000). On completion of the copying operation, the internal timer finishes counting ("Yes" in step S1020) and the CPU 501B judges whether the copying operation has been performed on all of the recording sheets (step S1030).

In the copying operation for the second recording sheet, the CPU 501B judges whether the document pre-reading flag is set at "0" (step S2010 of the subroutine shown in FIG. 20). Since the document pre-reading flag was set in the copying operation for the first recording sheet (that is, "No" in step S2010), the CPU 501B returns to the main routine. This is to say, the subroutine for the image input preprocessing from step S2020 is not performed on the second recording sheet onward. In the subroutine of step S4000 for the frame separation control processing, the CPU 501B judges whether the detection sensor (the pair of photo couplers 610 and 611) detects the leading edge of the recording sheet and also judges whether the value R representing the number in the order is "0" (step S4010). Since the value R is currently set at "2" ("No" in step S4010), the CPU 501B proceeds to step S4030 to judge whether the monochrome mode flag is set in the corresponding memory area. As shown in FIG. 18, the monochrome mode flag is not set in the memory area 372b, and the CPU 501B sets the mode in the color mode (step S4050). The value R is incremented by "1" (R="3") (step S4060), and the copying operation is performed in the color mode (step S5000) as in the case of the first recording sheet. On completion of the copying operation for the second recording sheet, the internal timer finishes counting (step S1020) and the CPU 501B judges whether the copying operation has been performed on all of the recording sheets (step S1030). The internal timer is reset to for the third copying operation (step S1010).

The third and fourth copies are made from the monochrome document. Since the monochrome copying operation is successively performed on the two recording sheets, the monochrome mode flag is set in both of the memory areas 373b and 374b corresponding to the third and fourth recording sheets as shown in FIG. 18. Therefore, the monochrome mode flag is judged to be set in the corresponding memory area ("Yes" in step S4030) and the CPU 501B sets the mode in the monochrome mode (step S4040). The value R is incremented by "1" (step S4060), and the CPU 501B returns to the main routine to have the copying operation be performed in the monochrome mode (step S5000). In the same way, the copying operation is performed on the fourth recording sheet in the monochrome mode.

The fifth copy is made from the color document. The CPU 501B refers to the memory area corresponding to the fifth recording sheet (i.e., R="5")(step S4030), and sets the mode in the color mode (step S4050). After the value R is incremented by "1" (step S4060), the CPU 501B returns to the main routine to have the copying operation be performed in the color mode (step S5000). In the same way, the copying operation is performed on the sixth recording sheet in the color mode.

The CPU 501B judges that the copying operation has been performed on all of the six recording sheets ("Yes" in step S1030), and finally this main routine is terminated.

It should be noted here that the distance between the recording sheets is controlled as in the case of the first embodiment, although the description is omitted in the present embodiment.

Fourth Embodiment

Next, the copier used in the fourth embodiment of the present invention is described. In the fourth embodiment, an explanation is given for the processing performed when the user specifies the productivity priority mode or the life priority mode using the operation panel 30. It is desirable that the document pre-reading is performed in the fourth embodiment as in the third embodiment. Suppose that the judgement result given by the ACS unit 505B as to whether the document is color or monochrome is stored in the RAM 508B, for example, in the fourth embodiment.

Figure 22:
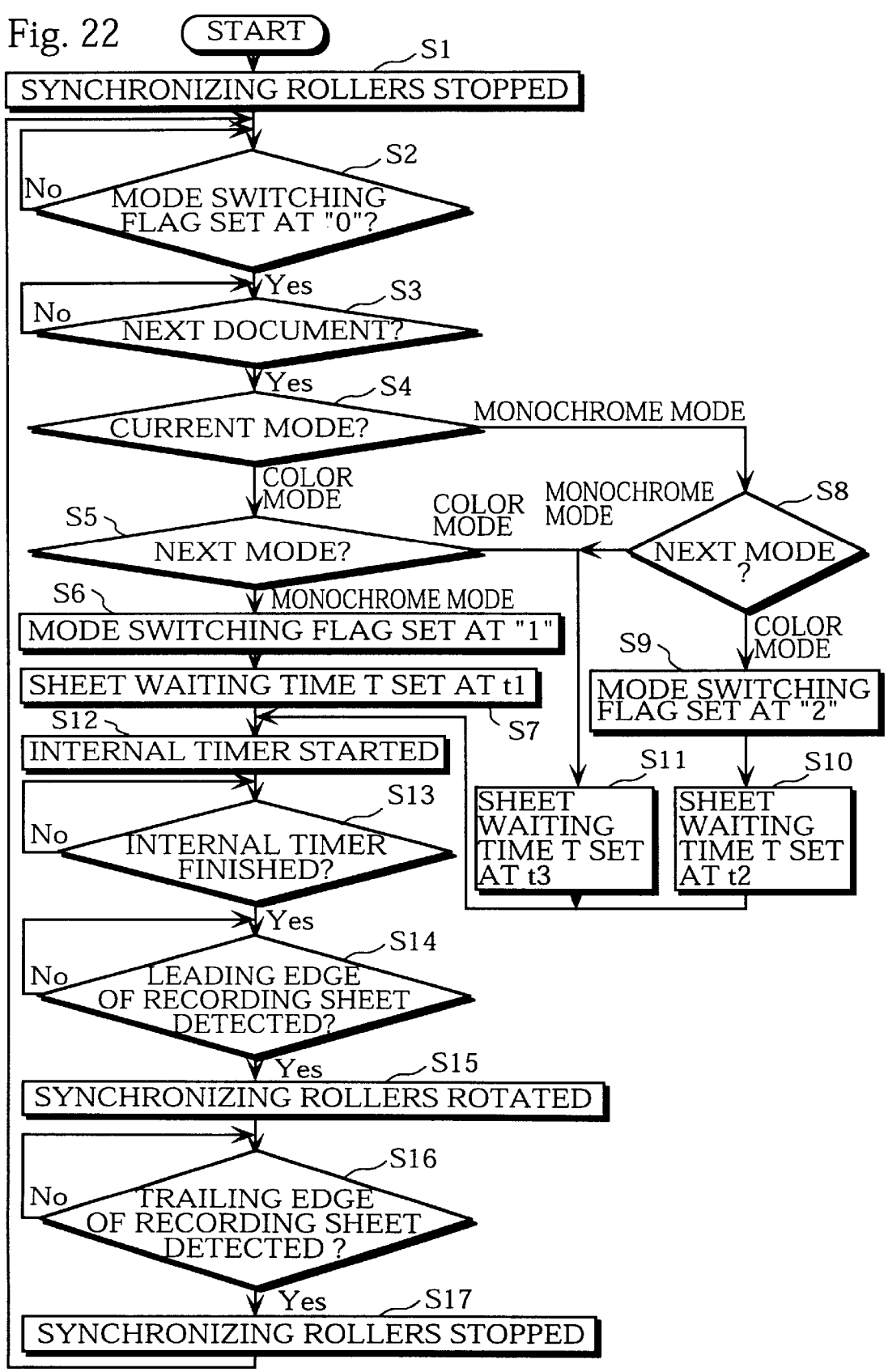
FIG. 22 is a flowchart showing the processing to control a distance between recording sheets when copying operations are successively performed.

The following is a specific description of the processing for controlling the distance between the recording sheets in the present embodiment. FIG. 22 is a flowchart showing the processing for controlling the distance between the recording sheets when the multi-copy is performed using the automatic document feeder 10 or the like. As shown in this flowchart, the CPU 501B first stops the rotations of the synchronizing rollers 74 and 75 for the initial setting (step S1). More specifically, as one example, the CPU 501B instructs a timing clutch controlling unit (not shown) to stop the rotations of the synchronizing rollers 74 and 75 by turning off a timing clutch (not shown). Receiving the instruction from the CPU 501B, the timing clutch controlling unit stops the rotations of the synchronizing rollers 74 and 75.

The CPU 501B next judges whether a mode switching flag is set at "0" (step S2). The mode switching flag referred to here is set when the mode needs to be switched between the pressing state and the separated state. Values set to the mode switching flag are described later. When the frame separating operation to switch the mode between the color mode and the monochrome mode is completed, the mode switching flag is reset to "0". When the mode switching flag is set at "0" ("Yes" in step S2), the CPU 501B refers to the RAM 508B to judge whether there is a next document to be copied (step S3). If there is not ("No" in step S3), the CPU 501B waits for data of the next document to be stored.

If there is a next document ("Yes" in step S3), the CPU 501B refers to the RAM 508B and the mode indicated by the selection displaying lamp 319 of the operation panel 30 to compare a current mode to a next mode (steps S4, S5, and S8). The current mode referred to here means the mode being currently operational for the current recording sheet, and the next mode means the mode to be operational for the next recording sheet. The state of the current mode includes the standby state which in turn includes the initial state. As described above, the mode in the initial state is set in the color mode.

When the current mode is the color mode (step S4) and the next mode is the monochrome mode (step S5), the CPU 501B sets the mode switching flag to "1" (step S6) and sets a sheet waiting time T at "t1" (step S7). Here, "t1" is previously set so that the distance between the recording sheets satisfy Equation 2.

When the current mode is the monochrome mode (step S4) and the next mode is the color mode (step S8), the CPU 501B sets the mode switching flag to 11211 (step S9) and sets the sheet waiting time T at "t2" (step S10). Here, "t2" is previously set so that the distance between the recording sheets satisfy Equation 4.

When the current mode is the same as the next mode (steps S4 and S5 or steps S4 and S8), the CPU 501B sets the sheet waiting time T at "t3" (step S11). Here, regardless of whether the same mode is the color mode or the monochrome mode, the sheet waiting time T is set at "t3". However, the sheet waiting time can be changed between the color mode and the monochrome mode as long as a value set as the sheet waiting time is an appropriate value satisfying Equations 3 and 5.

The next mode is judged from the indication by the selection displaying lamp 319 of the operation panel 30. The current mode and the next mode are the same as long as the mode indicated by the selection displaying lamp 319 is not changed during the successive copying operations. As such, the mode switching flag is not set.

When the selection displaying lamp 319 indicates that the life priority mode (described later) is specified, the CPU 501B judges whether the next mode is the color or monochrome mode by referring to the management table. More specifically, when the color information indicates that the next document is color, the next mode is judged to be the color mode, and when the color information indicates that the next document is monochrome, the next mode is judged to be the monochrome mode. Accordingly, since the mode is set corresponding to the color information of the document, each life of the components such as the image forming stations takes top priority.

The following is a description of a case where the selection displaying lamp 319 indicates the productivity priority mode (described later) is specified. In the productivity priority mode, the mode switching between the color mode and the monochrome mode may be performed according to various conditions. Alternatively, the color mode may be always set regardless of the color information of the next document. Using the present embodiment, the mode switching performed as shown in the flowchart of FIG. 22. If the current mode is the color mode (step S5), the next mode is also set in the color mode. Meanwhile, if the current mode is the monochrome mode (step S8) and the color information indicates that the next document is color, the next mode is set in the color mode. If, on the other hand, the current mode is the monochrome mode (step S8) and the color information indicates that the next document is monochrome, the next mode is set in the monochrome mode. As understood from the above description, the mode remains in the color mode or is switched from the monochrome mode to the color mode when necessary. Note that the mode is not switched from the color mode to the monochrome mode. Accordingly, the productivity takes top priority.

The mode switching flag is stored in the RAM 508B and the sheet waiting time T is represented by the time counted by the internal timer of the CPU 501B.

When the settings of the mode switching flag and the sheet waiting time T are completed, the internal timer starts counting (step S12). The CPU 501B waits for the internal timer to finish (step S13).

When the internal timer finishes counting ("Yes" in step S13), the CPU 501B waits for the photo couplers 610 and 611 to detect the leading edge of the transported recording sheet (step S14) and has the synchronizing rollers 74 and 75 rotate (step S15). More specifically, the CPU 501B instructs the timing clutch controlling unit (not shown) to start the rotations of the synchronizing rollers 74 and 75 by turning on the timing clutch (not shown). Receiving the instruction from the CPU 501B, the timing clutch controlling unit starts the rotations of the synchronizing rollers 74 and 75, which then feed the recording sheet toward the transporting belt 65.

The CPU 501B waits for the trailing edge of the recording sheet to pass by the photo couplers 610 and 611 (step S16). After a predetermined period of time has elapsed since the detection of the trailing edge of the recording sheet, the CPU 501B instructs the timing clutch controlling unit (not shown) to stop the rotations of the synchronizing rollers 74 and 75 by turning on the timing clutch (not shown) (step S17). Then, the CPU 501B returns to step S3 to judge whether there is a next document to be copied.

If the photo couplers 610 and 611 are currently detecting the recording sheet, the photo couplers 610 and 611 output an ON signal, or if not, the photo couplers 610 and 611 output an OFF signal. In step S16 where the trailing edge of the recording sheet is detected, the CPU 501B detects an off-edge where the output from the photo couplers 610 and 611 is changed ON to OFF.

The predetermined period of time is set in accordance with the stated equations so that the CPU 501B controls the rotations of the synchronizing rollers 74 and 75 at an optimum timing to give an appropriate distance between the recording sheets. Specifically, the distance between the recording sheets is controlled in accordance with the sheet waiting times t1 to t3.

Figure 23:
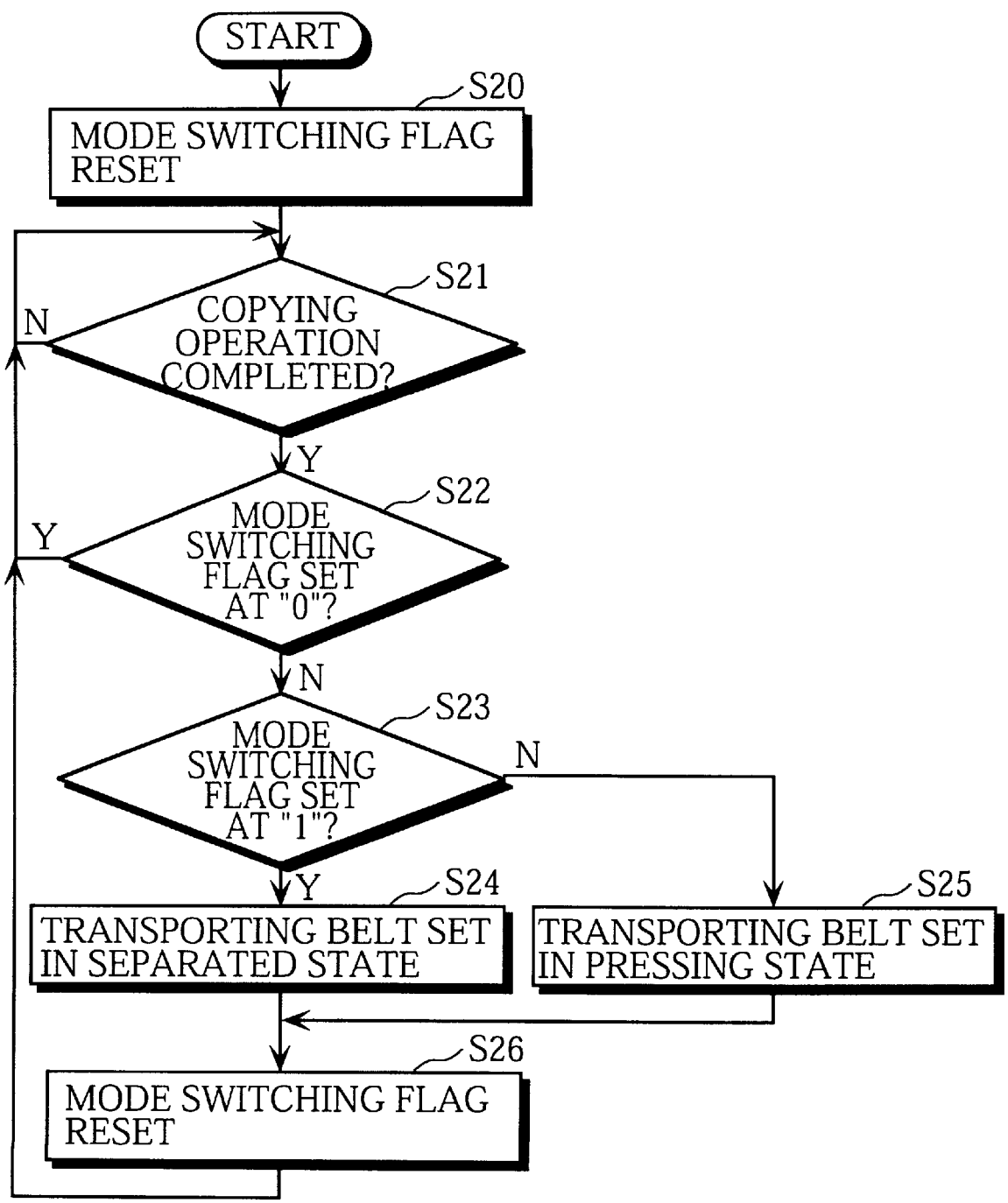
FIG. 23 is a flowchart showing the processing to control the mode switching.

Next, the mode switching operation is explained. FIG. 23 is a flowchart showing the processing for controlling the mode switching operation. It should be noted here that this processing shown in FIG. 23 is performed in parallel with the processing for controlling the distance between the recording sheets as explained using the flowchart of FIG. 22. The mode switching flag is set to "1" or "2" during the successive copying operations in the processing shown in FIG. 22. Also, the mode switching flag is set to "1" or "2" when the mode indicated by the selection displaying lamp 319 of the operation panel 30 is changed by the user during the standby state of the copier. Specifically, the mode switching flag is set to "1" if the mode is changed from the color mode to the monochrome mode and is set to "2" if the mode is changed from the monochrome mode to the color mode.

In the processing for controlling the mode switching operation shown in FIG. 23, the mode switching flag is reset in the initial setting (step S20) and the CPU 501B waits for the copying operation for the first recording sheet to be completed (step S21). The CPU 501B can judge the copying operation for the first recording sheet has been completed, using the following method, for example. The CPU 501B may calculate time taken for the recording sheet to pass by the photosensitive drum 601K in advance. It may be calculated by dividing the addition of the distance from the photo couplers 610 and 611 to the transfer position of the photosensitive drum 601K and the longitudinal length of the recording sheet by the transportation speed of the recording sheet. After this calculated time elapses from the detection of recording sheet passing by the photo couplers 610 and 611, the CPU 501B may judge that the recording sheet has passed the transfer position of the photosensitive drum 601K, that is, the copying operation for the recording sheet has been completed. Alternatively, a detection sensor SE3 for detecting the recording sheet may be provided after the transfer position of the photosensitive drum 601K in the transportation direction. When the detection sensor SE3 detects the off-edge of the recording sheet after the detection of the recording sheet passing by the photo couplers 610 and 611, the CPU 501B may judge that the copying operation for the recording sheet has been completed.

When the copying operation for the recording sheet is completed or when the copier is in standby state, the CPU 501B judges whether the mode switching flag is set at "0" (step S22). If so ("Yes" in step S22), the mode switching is not needed and the CPU 501B returns to step S21. If not ("No" in step S22), the CPU 501B next judges whether the flag is set at "1" (step S23).

If the mode switching flag is set at "1" ("Yes" in step S23), the CPU 501B has the cam shaft 66c rotate so that the transporting belt 65 is in the separated state (step S24). As a result, the mode is switched from the color mode to the monochrome mode. Meanwhile, if the mode switching flag is not set at "1" ("No" in step S23), this means that the flag is set at "2". In this case, the CPU 501B has the cam shaft 66c rotate so that the transporting belt 65 is in the pressing state (step S25). As a result, the mode is switched from the monochrome mode to the color mode.

After the switching operation, the CPU 501B resets the mode switching flag to "0" (step S26) and then returns to step S21.

In the mode switching operation of the present embodiment, the CPU 501B has the cam shaft 66c rotate after the preceding copying operation is completed, so that problems, such as the mechanical vibrations caused by the shifting of the transporting belt 65, have no effect on the preceding copying operation. The following are the matters that should be considered for the setting of the sheet waiting time.

(1) The distance between the recording sheets needs to be controlled using the sheet waiting times t1 or t2 so that the problems, such as the mechanical vibrations caused by the shifting of the transporting belt 65, have no effect on the copying operation.

(2) The values of the sheet waiting times t1 to t3 need to be set so that the image formation is not adversely affected. The sheet waiting times t1 and t2, in particular, need to be set so that the problems, such as the mechanical vibrations caused by the shifting of the transporting belt 65, have no effect on the copying operation when the mode is changed between the color mode and the monochrome mode. More specifically, if the shifting of the transporting belt 65 is not completed before the image formation, the transfer positions are unstable, and as a result, color displacements may occur and the toner image may be transferred onto the recording sheet at an incorrect position. The sheet waiting times t1 and t2 need to be set to prevent these problems from occurring.

(3) In the present embodiment, when the copying operation is successively performed on one recording sheet and a next recording sheet in the same mode, the sheet waiting time t3 is set in consideration of a time period taken for the recording sheet to pass by the fixing unit 80 after the image transfer or a time period taken for each component to perform the corresponding processing.

(4) The sheet waiting times t1 to t3 needs to be minimized within a range which satisfies the stated equations so that the image quality can be properly maintained and decreases in the speed of copy operations can be suppressed.

(5) It is desirable that the transport belt 65 is rotated at a constant speed even during the shift operation of the frame 64, thereby maintaining the productivity.

(6) It is desirable that the CPU 501B has the rotations of the photosensitive drums 601C to 601Y which are not used for the monochrome image formation stop when the separating operation of the transporting belt 65 is completed, so that respective frictions between the photosensitive drums 601C to 601Y and the drum cleaners 605C to 605Y can be prevented. In this case, the CPU 501B needs to have the photosensitive drums 601C to 601Y rotate for the color copying operation on completion of pressing operation of the transporting belt 65.

Figure 24:
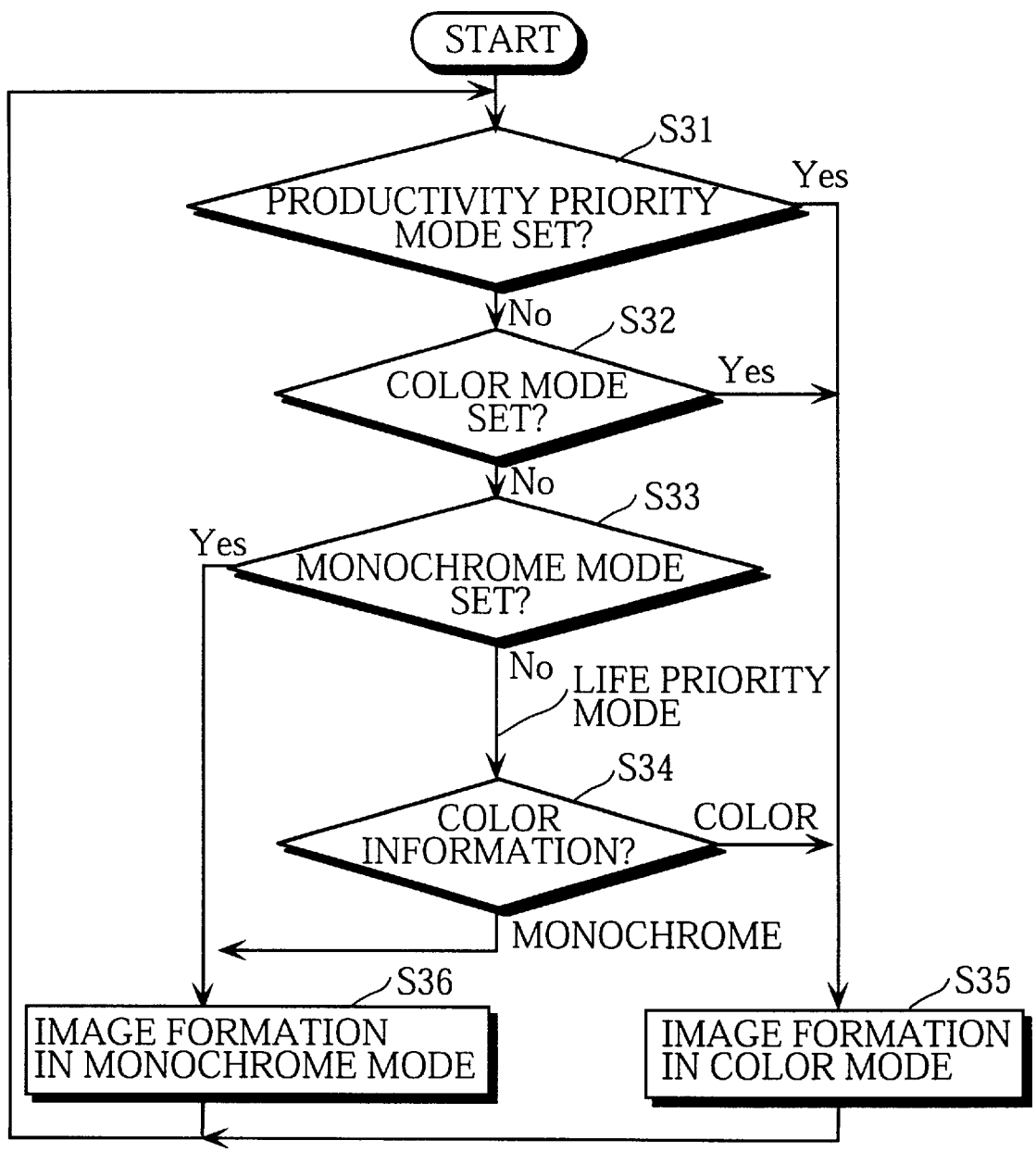
FIG. 24 is a flowchart showing a processing example to determine the mode in the fourth embodiment.

The processing for determining the mode using the copier of the fourth embodiment is next explained. FIG. 24 is an example of the processing for determining the mode by referring to the selected mode indicated by the selection displaying lamp 319 and the judgement result given by the ACS unit 505B as to whether the document is color or monochrome in accordance with the image data obtained from the document.

When the selection displaying lamp 319 indicates that the productivity priority mode is being currently selected ("Yes" in step S31) or that the color mode is being currently selected ("Yes" in step S32), the image formation is performed in the color mode (step S35).

Meanwhile, when the selection displaying lamp 319 indicates that the monochrome mode is being currently selected ("Yes" in step S33), the image formation is performed in the monochrome mode (step S36).

If the monochrome mode is not being currently set and the selection displaying lamp 319 indicates that the life priority mode is being currently selected ("No" in step S33), the CPU 501B determines the mode to be selected in accordance with the result given by the ACS unit 505B for each document to assign top priority to the life of the components provided in the copier (steps S34 to S36).

Figure 25:
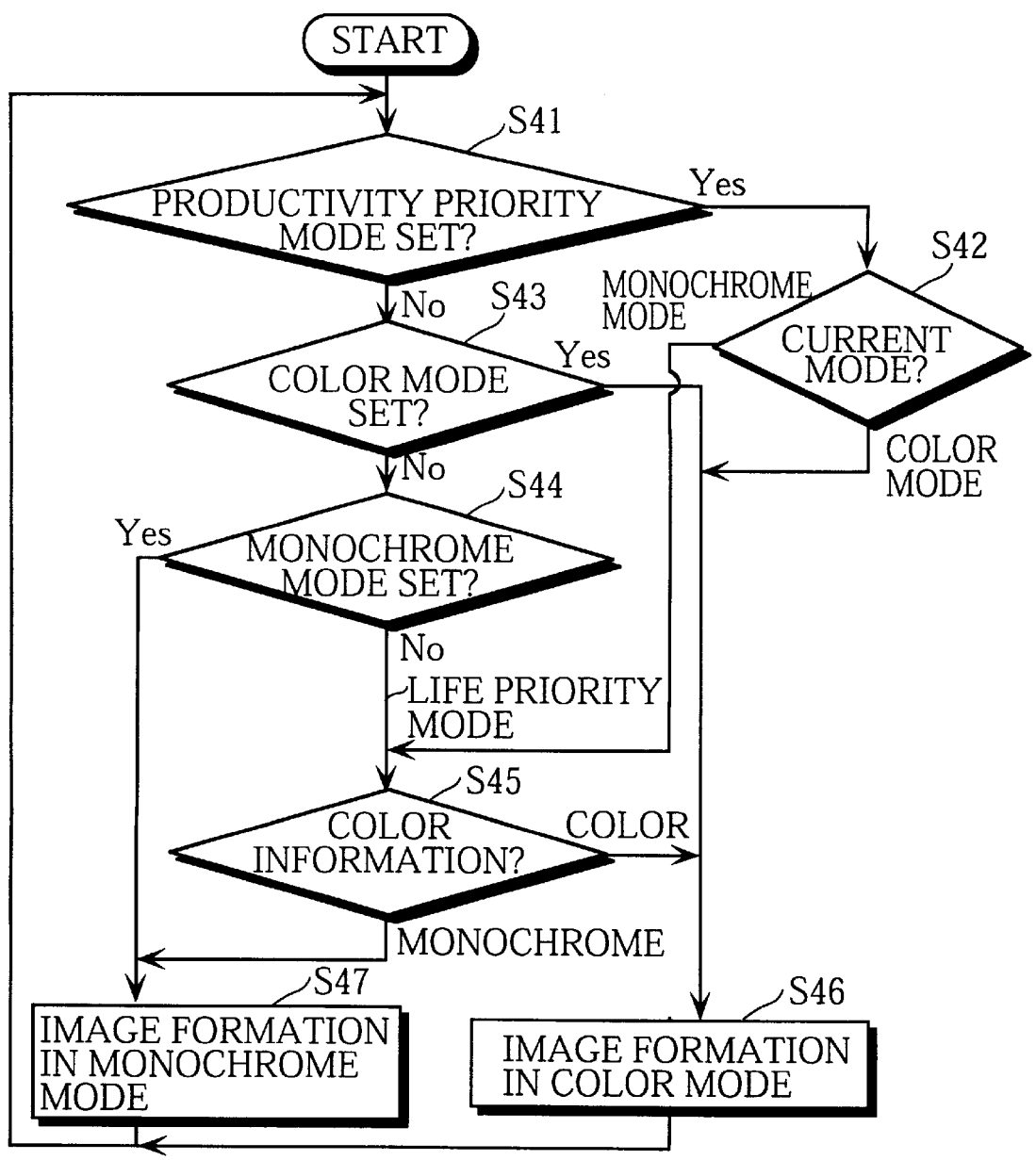
FIG. 25 is a flowchart showing another processing example to determine the mode in the fourth embodiment.

FIG. 25 shows another example of the processing for determining the mode in accordance with the user-selected mode indicated by the selection displaying lamp 319 and the judgement result given by the ACS unit 505B.

When the selection displaying lamp 319 indicates that the productivity priority mode is currently being selected ("Yes" in step S41), the CPU 501B judges whether the current mode is set in the color mode or the monochrome mode (step S42).

If the current mode is the monochrome mode, the CPU 501B determines the mode to be selected in accordance with the result given by the ACS unit 505B (steps S45 to S47). Meanwhile, if the current mode is the color mode in step S42, the image formation is performed in the color mode (step S46).

If the productivity priority mode is not being currently set ("No" in step S41) and the selection displaying lamp 319 indicates that the color mode is being currently selected ("Yes" in step S43), the image formation is performed in the color mode (step S46). If the selection displaying lamp 319 indicates that the monochrome mode is being currently set ("Yes" in step S44), the image formation is performed in the monochrome mode (step S47).

Meanwhile, the selection displaying lamp 319 indicates that the life priority mode is being currently selected ("No" in step S44), the CPU 501B determines the mode to be selected in accordance with the result given by the ACS unit 505B (steps S45 to S47)

In the present embodiment, a page number of the document, a storage position of the density data for each of the reproduction colors (i.e., an address in the RAM 508B), and a result given by the ACS unit 505B are stored corresponding to one another in a management table of the RAM 508B. Therefore, the CPU 501B can easily determine the mode for each document by referring to this management table.

Accordingly, if the selection displaying lamp 319 indicates that the life priority mode is being currently selected, the mode is automatically switched between the color mode and the monochrome mode for each document, so that the user does not bother to specify the mode. Consequently, the top priority is assigned to each life of the components, such as the image forming stations.

Meanwhile, if the selection displaying lamp 319 indicates that the productivity priority mode is being currently selected, the time period taken for the image formation is shorter by the time period required for the mode switching. As a result, the top priority is assigned to the productivity.

In the present embodiment, when the selection displaying lamp 319 indicates that the productivity priority mode is being currently selected, the mode will remain in the color mode or the mode is switched from the monochrome mode to the color mode. This is to say, the mode is not switched from the color mode to the monochrome mode. However, the processing performed when the productivity priority mode is specified is not limited to this, as long as the productivity takes a high priority by reducing the frequency of the mode switching. As one example, a rule concerning the mode switching may be predetermined, such as a rule that "the mode should be switched from the color mode to the monochrome mode when the monochrome images are to be successively reproduced on at least three recording sheets". According to this rule, the CPU 501B may determine the mode by referring to the preceding mode and color information.

The CPU 501B may judge whether the automatic document feeder 10 is used from the detection of a document set on the document setting tray 101. This judgement may be made from the setting specified by the user, or the detection by a sensor or the like. If the CPU 501B judges the automatic document feeder 10 is used, it is considered that the user specifies the productivity priority. Therefore, irrespective of the mode indicated by the selection displaying lamp 319, the productivity may be assigned top priority or the productivity priority mode may be automatically selected.

Meanwhile, when the automatic document feeder 10 is not used, the CPU 501B judges whether the user manually sets a document on the document reading position. This judgement may be made from the setting specified by the user, or the detection by a sensor or the like. If the CPU 501B judges that the user manually sets the document on the document reading position, it is not considered that the user specifies the productivity priority. In this case, irrespective of the mode indicated by the selection displaying lamp 319, the lives of the components may be assigned top priority or the life priority mode may be automatically selected.

The CPU 501B may judge whether the image data to be reproduced is obtained from an external device, for example, when the image forming apparatus of the present invention is used as a facsimile. If the image data is judged to be obtained from the external device, it is considered that the user is not waiting. Thus, irrespective of the mode indicated by the selection displaying lamp 319, the lives of the components may be assigned top priority or the life priority mode may be automatically selected.

Modifications

The present invention has been described in accordance with the stated embodiments. It should be obvious that the technological scope of the present invention is not limited to the scope described in these embodiments, so that the following modifications can be made.

(1) Although the frame 64 is shifted downward in the monochrome mode so that the transporting belt 65 is separated from the photosensitive drums 601C to 601Y which are not used for forming the monochrome image in the stated embodiments, the method for separating the transporting belt 65 and the photosensitive drums 601C to 601Y is not limited to this. For example, the photosensitive drums 601C to 601Y may be shifted upward to separate them from the transporting belt 65.

(2) In the fourth embodiment, when the selection displaying lamp 319 indicates that the productivity priority mode is being currently selected, the CPU 501B checks that the document to be copied is color or monochrome and determines the mode for each recording sheet. However, when a plurality of copies is made from one document, the CPU 501B does not need to judge the mode for each recording sheet. More specifically, the CPU 501B may judge the mode only for the first recording sheet out of the plurality of recording sheets and the image formation may be performed on the second recording sheet onward in the mode determined for the first recording sheet.

(3) In the stated embodiments, the same components are used for the image forming stations 600C to 600K so that manufacturing costs can be reduced and maintenance can be simplified. Thus, distances between the image forming stations are equal in the stated embodiments. However, the constructions of the image forming stations 600C to 600K may be different and the distances between them may not be necessarily equal.

(4) Although the present invention has been described for the copier by which the images are transferred onto the recording sheet transported by the transporting belt 65, the present invention is not limited to this. For example, the present invention may be applied to a copier by which the images formed on the photosensitive drums are transferred onto the transport belt first as an intermediate transfer member and the superimposed image formed on the transport belt is then transferred onto the recording sheet.

(5) Although a tandem-type full-color copier is described as the present invention in the first to fourth embodiments, the present invention is not limited to this and can be applied to image forming apparatuses which form color images. For example, a color printer and a color facsimile can be used.

(6) In the stated embodiments, the monochrome mode is described as a reduced-color mode, and only the photosensitive drum 601K is driven in the monochrome mode. However, the image formation in the reduced-color mode may be performed using one of colors C, M, and Y. Alternatively, a color other than the reproduction colors can be used.

Although the present invention has been fully described by way of examples with reference to the accompanying drawings, it is to be noted that various changes and modifications will be apparent to those skilled in the art.

Therefore, unless such changes and modifications depart from the scope of the present invention, they should be constructed as being included therein.

What is claimed is:

1. An image forming apparatus comprising:
   an obtaining unit for obtaining image data of an image which is to be formed;
   a judging unit for judging whether the image which is to be formed is a color image or a monochrome image;
   a plurality of developing units;
   a first image forming unit for forming an image using at least one of the plurality of developing units, with the developing units aside from the at least one of the plurality of developing units being operational, in accordance with the image data obtained by the obtaining unit;
   a second image forming unit for forming an image using one of the plurality of developing units in accordance with the image data obtained by the obtaining unit; and
   a controlling unit for having the second image forming unit form an image in a case where the image to be formed is a monochrome image and monochrome image formations have been successively performed at least a predetermined number of times, and for having the first image forming unit form an image in all other cases.

2. The image forming apparatus of claim 1, wherein the one of the plurality of developing units that is used by the second image forming unit includes black toner.

3. The image forming apparatus of claim 1, wherein the plurality of developing units are set in line.

4. The image forming apparatus of claim 3 further comprising
   a transporting unit for transporting an image carrier, on which an image is to be formed, to each development position of the plurality of developing units.

5. The image forming apparatus of claim 4 further comprising
   a separating unit for separating the image carrier and the developing units aside from the developing unit used by the second image forming unit when an image formation is performed by the second image forming unit.

6. The image forming apparatus of claim 5, wherein the transporting unit is an image carrier transporting belt.

7. The image forming apparatus of claim 5 further comprising
   a transporting time interval controlling unit for controlling a time interval between image carriers that are transported before and after separation by the separating unit.

8. The image forming apparatus of claim 1 further comprising:
   a document tray for holding a plurality of documents; and
   a reading unit for reading the plurality of documents one at a time to obtain image data of each document,
   wherein the obtaining unit obtains the image data from the reading unit.

9. An image forming apparatus comprising:
   an obtaining unit for obtaining image data of an image which is to be formed;
   a plurality of developing units;
   a first image forming unit for forming an image using at least one of the plurality of developing units, with the developing units aside from the at least one of the plurality of developing units being operational, in accordance with the image data obtained by the obtaining unit;
   a second image forming unit for forming an image using one of the plurality of developing units in accordance with the image data obtained by the obtaining unit;
   a mode selecting unit for selecting an image formation mode from a first mode and a second mode;
   a judging unit for judging whether the image which is to be formed is a color image or a monochrome image;
   a controlling device, which includes a switching unit for switching between having an image formed by the first image forming unit and having an image formed by the second image forming unit in accordance with a judgement result given by the judging unit, for controlling the switching unit to switch less frequently when the first mode is selected than when the second mode is selected.

10. The image forming apparatus of claim 9, wherein the controlling device further includes:
    a first controlling unit for having the first image forming unit form an image when the first mode is selected; and a second controlling unit, when the second mode is selected, for controlling the switching unit to have the first image forming unit form an image when the image to be formed is a color image and to have the second image forming unit form an image when the image to be formed is a monochrome image.

11. The image forming apparatus of claim 10, wherein the plurality of developing units are set in line.

12. The image forming apparatus of claim 11 further comprising
a transporting unit for transporting an image carrier to each development position of the plurality of developing units.

13. The image forming apparatus of claim 12, wherein the switching unit separates the image carrier and the developing units of the plurality of developing units aside from the developing unit used by the second image forming unit when the image formation is performed by the second image forming unit.

14. The image forming apparatus of claim 13 further comprising
a transporting time interval controlling unit for controlling a time interval between image carriers that are transported before and after separation by the switching unit.

15. The image forming apparatus of claim 9,
wherein the controlling device further includes:
a first controlling unit, when the first mode is selected, for controlling the switching unit:
to have the first image forming unit form an image if a preceding image formation is performed by the first image forming unit;
to have the second image forming unit form an image if the preceding image formation is performed by the second image forming unit and the image to be formed is a monochrome image; and
to have the first image forming unit form an image if the preceding image formation is performed by the second image forming unit and the image to be formed is a color image; and
a second controlling unit, when the second mode is selected, for controlling the switching unit:
to have the first image forming unit form an image if the image to be formed is a color image; and
to have the second image forming unit form an image if the image to be formed is a monochrome image.

16. The image forming apparatus of claim 15, wherein the plurality of developing units are set in line.

17. The image forming apparatus of claim 16, further comprising
a transporting unit for transporting an image carrier to each development position of the plurality of developing units.

18. The image forming apparatus of claim 17, wherein the switching unit separates the image carrier and the developing units of the plurality of developing units aside from the developing unit used by the second image forming unit when an image formation is performed by the second image forming unit.

19. The image forming apparatus of claim 18 further comprising
a transporting time interval controlling unit for controlling a time interval between image carriers that are transported before and after separation by the switching unit.

20. The image forming apparatus of claim 9,
wherein the controlling device controls the image forming apparatus to be on standby in one of a first state where an image formation is to be performed by the first image forming unit and a second state where an image formation is to be performed by the second image forming unit, and further includes:
a first controlling unit, when the first mode is selected, for controlling the switching unit
to have the first image forming unit form an image if the image forming apparatus is on standby in the first state,
to have the second image forming unit form an image if the image forming apparatus is on standby in the second state and the image to be formed is a monochrome image, and
to have the first image forming unit form an image if the image forming apparatus is on standby in the second state and the image to be formed is a color image; and
a second controlling unit, when the second mode is selected, for controlling the switching unit to have the first image forming unit form an image if the image to be formed is a color image and to have the second image forming unit form an image if the image to be formed is a monochrome image.

21. The image forming apparatus of claim 20, wherein the plurality of developing units are set in line.

22. The image forming apparatus of claim 21 further comprising
a transporting unit for transporting an image carrier to each development position of the plurality of developing units.

23. The image forming apparatus of claim 22, wherein the switching unit separates the image carrier and the developing units of the plurality of developing units aside from the developing unit used by the second image forming unit when the image formation is performed by the second image forming unit.

24. The image forming apparatus of claim 23 further comprising
a transporting time interval controlling unit for controlling a time interval between image carriers that are transported before and after separation by the switching unit.

25. The image forming apparatus of claim 2, wherein an image formation is performed by the one of the plurality of developing units that includes black toner when a black image is formed by the first image forming unit.

26. An image forming apparatus comprising:
a plurality of developing units, one of the plurality of developing units including black toner;
first image forming means for forming an image, with the plurality of developing units being operational;
second image forming means for forming an image, with only the one of the plurality of developing units that includes black toner being operational; and
controlling means for having the second image forming means form an image in a case where the image to be formed is a black image and black image formations are to be successively performed at least a predetermined number of times, and for having the first image forming means form an image in cases when the image to be formed is a color image and when black image formations are to be successively performed less than the predetermined number of times after a color image formation.

27. The image forming apparatus of claim 26, wherein an image formation is performed by the one of the plurality of developing units that includes black toner when a black image is formed by the first image forming means.

28. The image forming apparatus of claim 27 further comprising:

a transporting belt for transporting a recording sheet to each developing position of the plurality of developing units; and a separating means for separating the transporting belt from the developing units aside from the one of the plurality of developing units that includes black toner when an image is formed by the second image forming means.

* * * * *